US010829932B2

(12) United States Patent
Wennberg

(10) Patent No.: US 10,829,932 B2
(45) Date of Patent: Nov. 10, 2020

(54) SHAPEABLE BUNDLES OF SLIDABLY-INTERLOCKED EXTRUSIONS FOR ARCHITECTURAL OR OTHER CONSTRUCTION COMPONENTS

(71) Applicant: Paul Winton Wennberg, Redmond, WA (US)

(72) Inventor: Paul Winton Wennberg, Redmond, WA (US)

(*) Notice: Subject to any disclaimer, the term of this patent is extended or adjusted under 35 U.S.C. 154(b) by 0 days.

(21) Appl. No.: 16/125,695

(22) Filed: Sep. 8, 2018

(65) Prior Publication Data

US 2020/0080307 A1 Mar. 12, 2020

(51) Int. Cl.
| | | |
|---|---|---|
| *E04C 1/39* | (2006.01) | |
| *E04B 1/28* | (2006.01) | |
| *E04B 2/46* | (2006.01) | |
| *B29C 48/12* | (2019.01) | |
| *B29L 31/10* | (2006.01) | |
| *E04B 2/02* | (2006.01) | |
| *B29K 27/06* | (2006.01) | |

(52) U.S. Cl.
CPC .............. *E04C 1/39* (2013.01); *B29C 48/12* (2019.02); *E04B 1/28* (2013.01); *E04B 2/46* (2013.01); *B29K 2027/06* (2013.01); *B29L 2031/10* (2013.01); *E04B 2002/0226* (2013.01)

(58) Field of Classification Search
CPC ..... E04C 1/39; E04B 2/46; E04B 1/28; E04B 2002/0226; B29C 48/12; B29L 2031/10; B29K 2027/06
USPC ........................................................ 52/589.1
See application file for complete search history.

(56) References Cited

U.S. PATENT DOCUMENTS

| | | | | |
|---|---|---|---|---|
| 3,220,062 A | * | 11/1965 | Hermann | E06B 3/22 49/484.1 |
| 4,848,856 A | * | 7/1989 | Dyment | A47F 3/02 312/135 |
| 5,322,108 A | * | 6/1994 | Hoffman | E06B 9/165 160/235 |
| 5,608,999 A | * | 3/1997 | McNamara | E04B 1/12 52/220.1 |
| 5,618,853 A | * | 4/1997 | Vonken | B29C 44/5663 521/60 |
| 5,701,713 A | | 12/1997 | Silver | |
| 5,888,609 A | * | 3/1999 | Karttunen | B29C 70/22 156/148 |
| 6,264,403 B1 | * | 7/2001 | Hall | E02D 5/54 405/231 |

(Continued)

*Primary Examiner* — Jeanette E Chapman

(57) ABSTRACT

Flexible extrusions of selected die patterns may be slid or snapped together to create bundles of slidably-interlocked extrusions that may be used to create structural components for architectural and a plurality of other construction purposes. Components such as standard rectangular construction beams, arches, domes, architectural trees, cylinders, molds, puzzling mazes, furniture, rollercoaster track, and other applications are illustrated and described in embodiments herein. Bundles of slidably-interlocked extrusions may be formed into a straight beam, bent into an arch, or twisted into other forms as desired. Bundles of slidably-interlocked extrusions may for example, comprise subsets of different length bundles of extrusions that may extend the length create long-span support beams or that may branch away at an angle from the starting beam to form a treelike structure.

22 Claims, 22 Drawing Sheets

(56) References Cited

U.S. PATENT DOCUMENTS

| | | |
|---|---|---|
| 7,841,850 B2 | 11/2010 | Mottahedeh |
| 7,975,452 B2 | 7/2011 | Wennberg |
| 8,443,566 B2 | 5/2013 | Wennberg |
| 8,793,957 B2 | 8/2014 | Wennberg |
| 9,222,258 B2 | 12/2015 | Wennberg |
| 2002/0185945 A1* | 12/2002 | Hollebone ............. A47B 67/04 312/265.1 |
| 2006/0059848 A1 | 3/2006 | MacDonald-Schmidt et al. |
| 2006/0150485 A1* | 7/2006 | Somerville ............ A01G 17/14 47/47 |
| 2009/0101195 A1 | 4/2009 | Reynolds et al. |
| 2012/0305826 A1* | 12/2012 | Gokcen .................. B29C 48/42 252/62 |

* cited by examiner

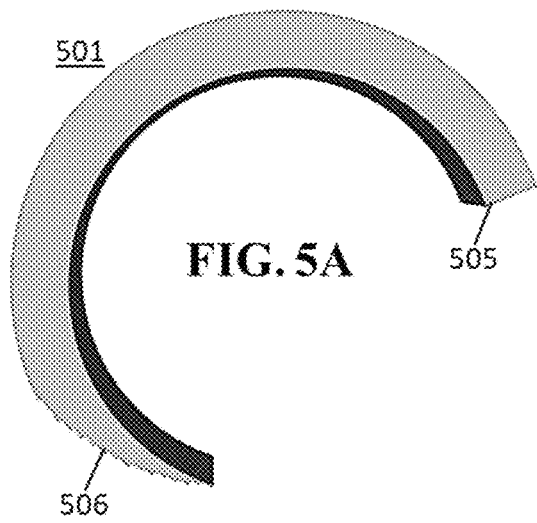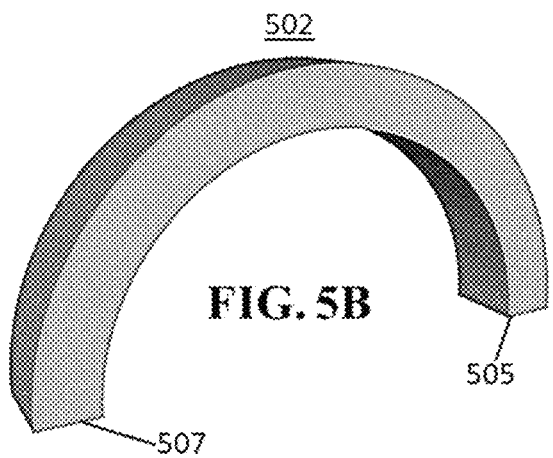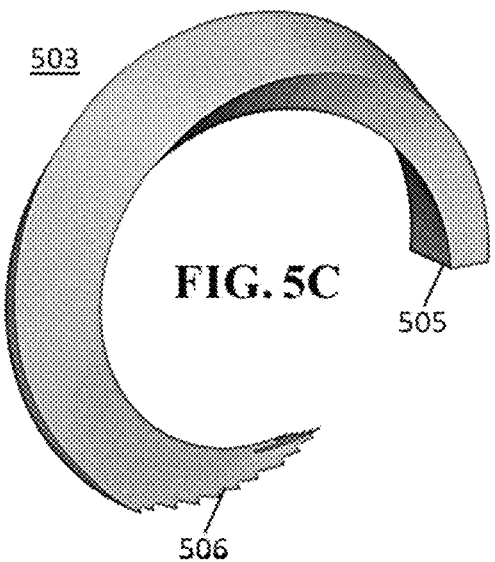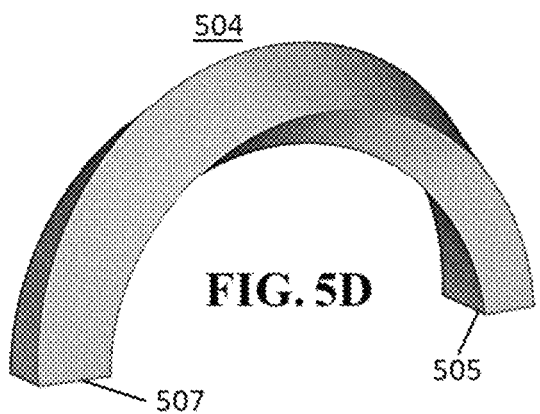

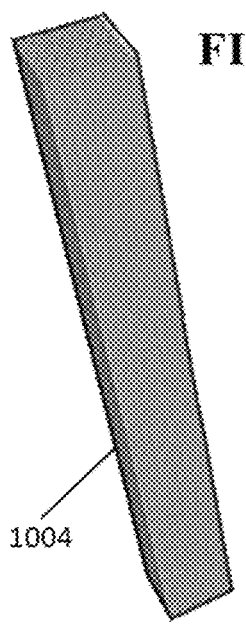
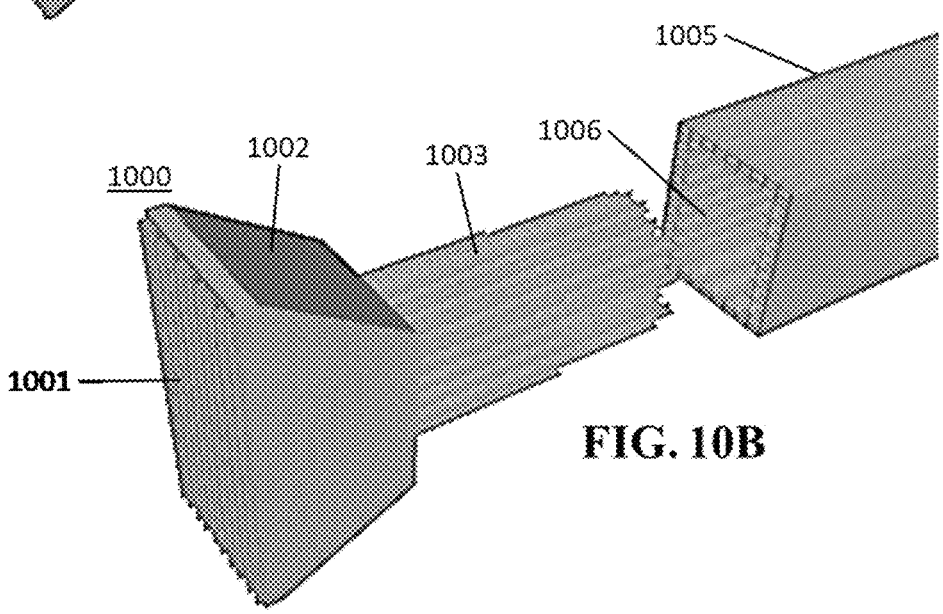
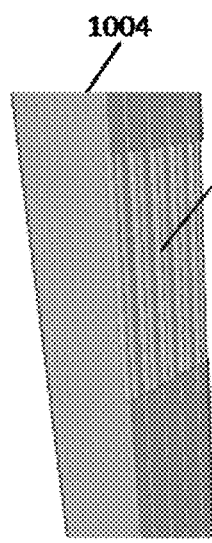
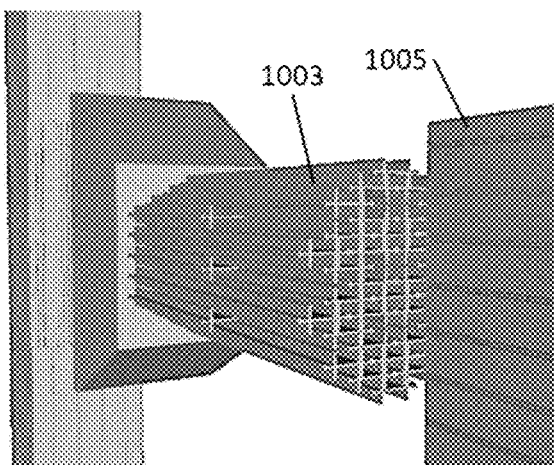
FIG. 10A
FIG. 10B
FIG. 10C
FIG. 10D

FIG. 13A
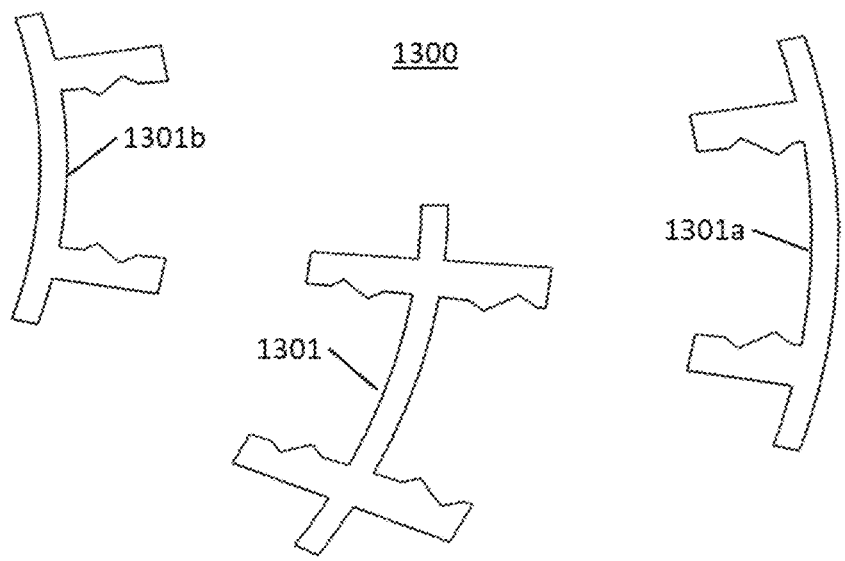
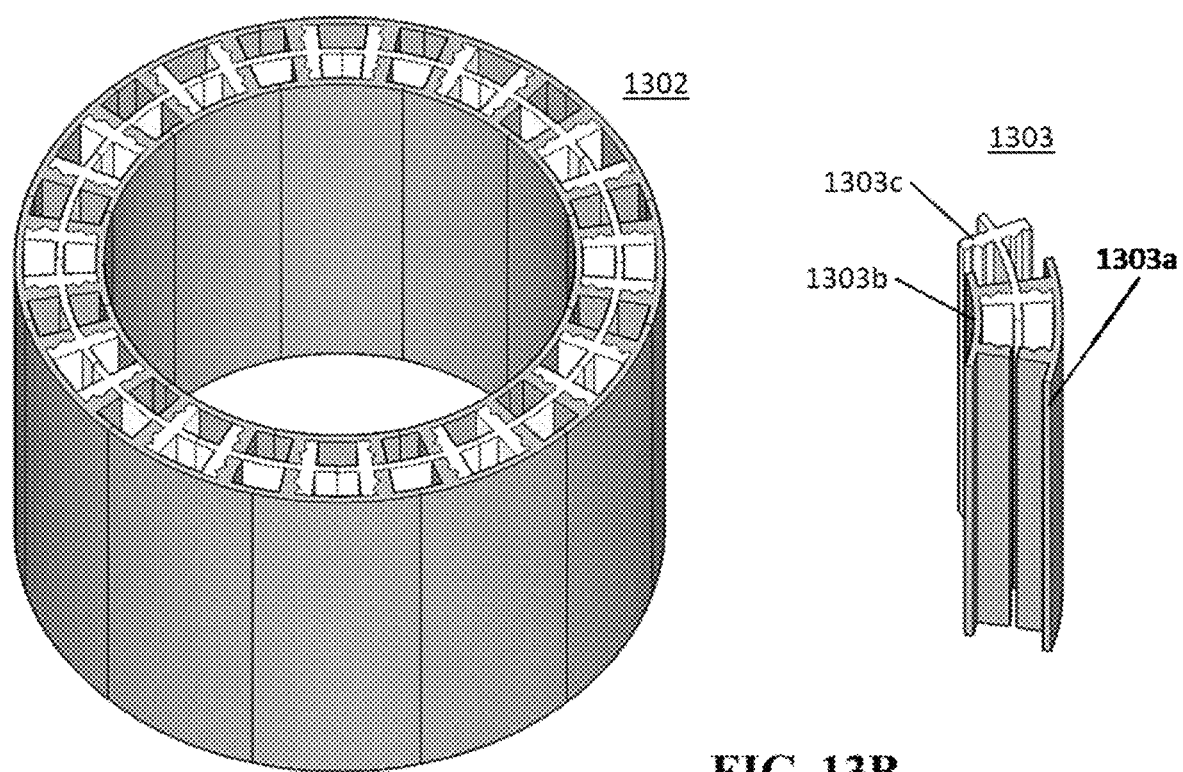
FIG. 13B

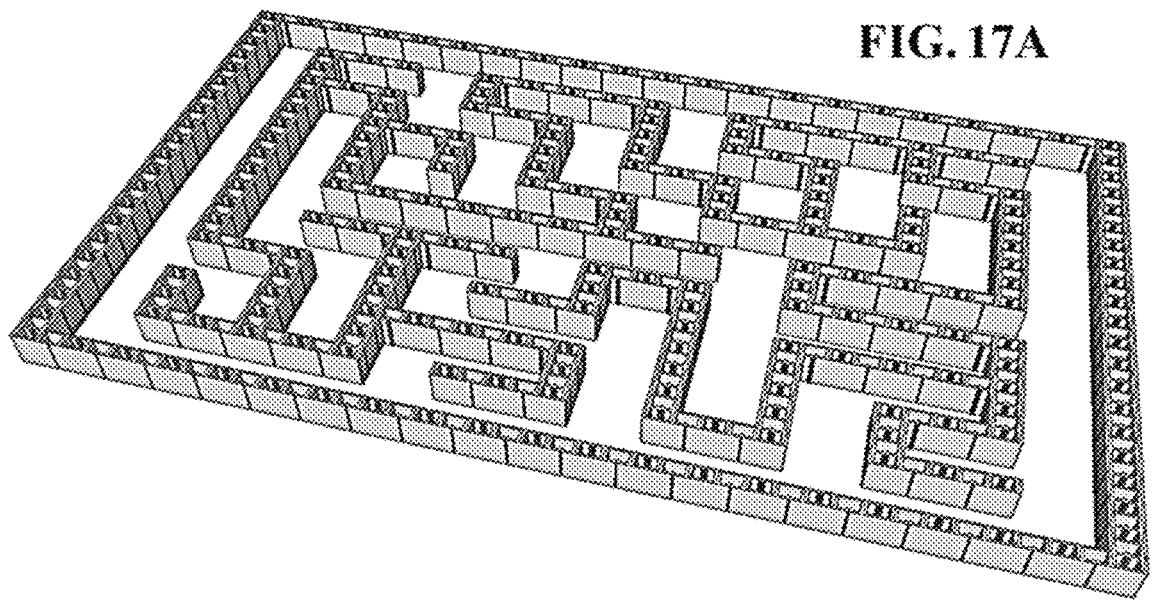
FIG. 17A
FIG. 17B
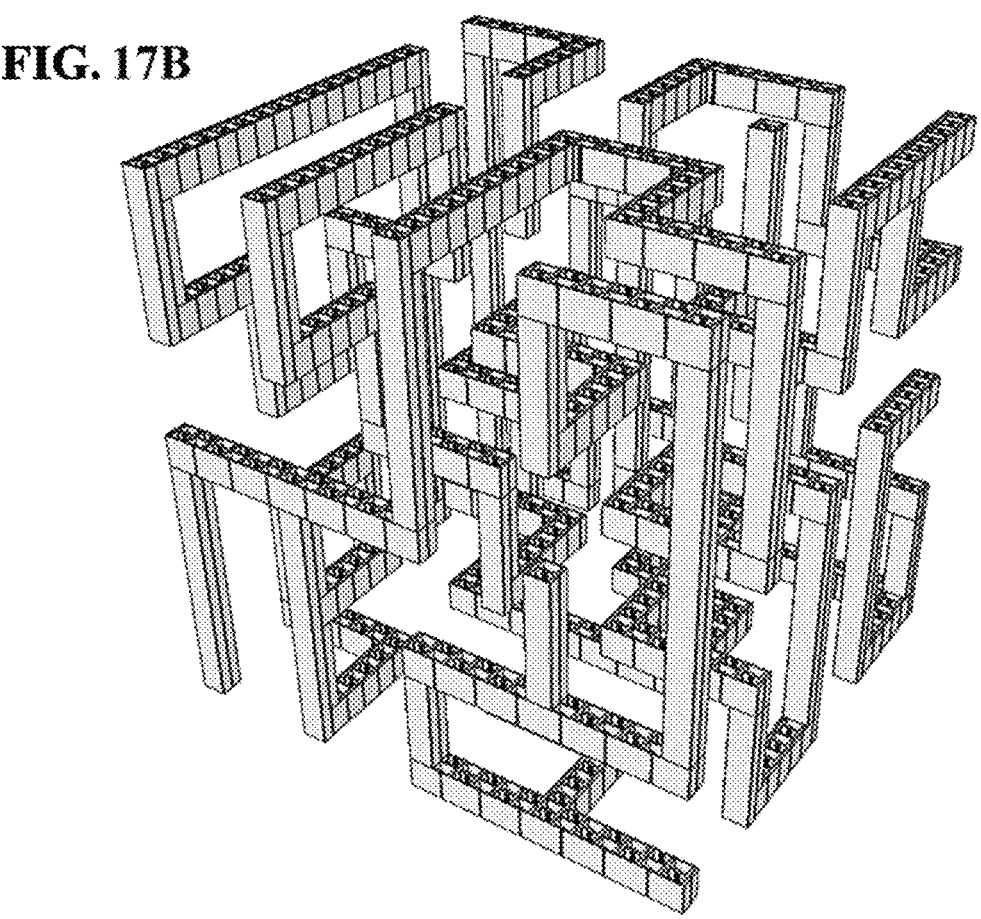

SHAPEABLE BUNDLES OF SLIDABLY-INTERLOCKED EXTRUSIONS FOR ARCHITECTURAL OR OTHER CONSTRUCTION COMPONENTS

CROSS-REFERENCE TO RELATED APPLICATIONS

This application is related by subject matter to the inventions disclosed in U.S. Pat. No. 9,222,258 ("the '258 patent") [Wennberg], which is incorporated herein by reference in its entirety.

BACKGROUND

Architectural design is often limited by the compromise of artistic design, structural integrity, and budgetary constraints. Constructing curved structural beams with the desired surface appearance is labor intensive, costly, and often difficult to make—especially load-bearing curved beams. Many materials used in construction (e.g., steel, aluminum, wood) have a relatively high carbon footprint as well as environmental damage due to mining, stressing threatened species, and disrupting ecosystems due to deforestation. While plastics that end up in landfills are not helpful to our environment, their durability may be well suited for playing a larger role in construction and reduce the negative externalities of construction by sequestering hydrocarbons into buildings rather than burning them and releasing carbon dioxide and other pollutants into our atmosphere. For example, polyvinylchloride (PVC) is currently made from natural gas but new sustainable processes have been developed to produce ethylene, the primary feedstock for making plastics, using solar, water, and carbon dioxide by mimicking natural photosynthesis. Using plastic or plastic-composite materials for making structural components for general construction of houses, sheds, or larger buildings and structures can significantly reduce the carbon footprint and environmental damage associated with contemporary construction materials. The inventions described herein are directed at simplifying the problems associated with constructing shaped structural beams.

SUMMARY

This summary is provided to introduce simplified concepts concerning extrusions of two-dimensional (2D) geometric shape profiles that are slidably interlocked to form bundles that can be bent, bowed, or twisted into shaped structural building components, embodiments of which are further described below in the Detailed Description. This summary is not intended to identify key or essential features of the claimed subject matter, nor is it intended for use in determining the scope of the claimed subject matter. Furthermore, the claimed subject matter is not limited to implementations that solve any or all disadvantages noted in any part of this disclosure.

Disclosed herein are embodiments of systems, apparatuses, and methods for making an extruded construction component using a plurality of extrusions of a flexible structural material, the extrusions made from a die pattern that enables one of the plurality of extrusions to be slidably interlocked along a first axis with another of the plurality of extrusions along the first axis, the slidably interlocked extrusions forming a slidably interlocked bundle of extrusions such that when a torque is applied along the first axis of the slidably interlocked bundle of extrusions at a distance from a first end of the slidably interlocked bundle of extrusions, the applied torque causing the plurality of extrusions to flex in one of a bend and a twist motion, and also causes the plurality of extrusions to slide relative to each other.

Further, the die pattern of the extrusions may comprise a conduit for channeling a binding agent along a length of an extrusion to deposit the binding agent at an interface where a surface of the extrusion is slidably interlocked with a surface of an adjacent extrusion.

A binding agent may be applied to one or more extrusions in the bundle of slidably interlocked extrusions to bind adjacent extrusions at slidably-interlocked extrusion surfaces to form a substantially rigid construction component.

When the slidably interlocked bundle of extrusions are bound together, the bundle may be cut across an end at an angle and elsewhere along the bundle to produce the desired substantially rigid construction component.

A bundle of slidably interlocked extrusions may also comprise one or more subsets of bundles of slidably interlocked extrusions that extend beyond the length of other extrusions.

The foregoing and other objects, features, and advantages of the inventions will become more apparent from the following detailed description, which proceeds with reference to the accompanying figures.

BRIEF DESCRIPTION OF THE DRAWINGS

To facilitate understanding of the advantages of the invention, a more complete description of the invention briefly described in the summary above, is given in the detailed description with reference to specific embodiments illustrated in the drawings listed below. These drawings depict embodiments of the invention and should not be considered as limiting in its scope. All cellular components and extrusions depicted in drawings herein may be embodied in any sizes, shapes, and forms for aesthetic and/or functional purposes that suit the needs of other embodiments. The invention will be described and explained in detail using specific references to elements depicted in the accompanying drawings.

The detailed description relies on references to the accompanying figures. The left-most digit(s) of a figure reference number identifies the figure in which the reference number first appears. For example, a reference to an object depicted in FIG. 1 may be identified as "100", while a feature of the object may be identified as "101" with a line drawn to the feature. The use of the same reference numbers in different locations in the description and in other figures may indicate similar or identical objects or features.

FIG. 5A depicts the structural beam of FIG. 4A after being bent into the form of an arch.

FIG. 5B depicts the arch of FIG. 5A with the extended inner extrusions cut to match the outermost extrusion length.

FIG. 5C depicts the arch of FIG. 5A with a twist applied to form a twisted arch.

FIG. 5D depicts the twisted arch of FIG. 5C with the extended inner extrusions cut to match the outermost extrusion length.

FIG. 10A depicts an exploded view of an extrusion adapter for joining a horizontal beam to a vertical beam.

FIG. 10B depicts a closeup of how the adapter of FIG. 10A fits into the horizontal beam.

FIG. 10C depicts a closeup of the adapter interconnection with the vertical beam FIG. 10D depicts a staggered closeup of the adapter from the horizontal beam view.

FIG. 13A depicts a set of cell patterns for extrusions that can be slidably interlocked to form a cylinder.

FIG. 13B illustrates how extrusions of the set of cell patterns depicted in FIG. 13A are interlocked to form a cylindrical structural component.

FIG. 17A-FIG. 17B depict 2D and 3D toy maze embodiments.

DETAILED DESCRIPTION

For at least the purposes of this description, the selected terms and phrases herein may have the following meanings:

a) "Die" (a.k.a. "Cell" and "Cellular Block") refers to a plate with a cut-out pattern through which a material can be forced to create an extrusion.

b) "Die Profile" (a.k.a. "Cell Profile") refers to the cut-out pattern of a die (a.k.a. cell) that defines the cross-sectional shape and dimensions of a material extruded through a die of a given die profile.

c) "Extruded Cellular Block" refers to a shaped material forced through a cellular block (a.k.a. die, cell).

d) "Cross-sectional Pattern" may refer to either 1) the pattern of a cross-section of a single extrusion as determined by the die profile from which the extrusion was made, or 2) the pattern of a cross-section of a bundle of slidably-interlocked extrusions.

e) "Bending" refers to forcing a length of material into an arch with a radius of curvature.

f) "Bowing" refers to deforming a relatively long beam to create a slight bend to, for example, a pretensioned beam.

g) "Arcuate" refers to the shape produced by either "Bending" or "Bowing".

h) "Slidably-interlocked Extrusions" refers to extrusions made from a die pattern having a design that allows two or more extrusions to be slid together to be interlocked in two axes and can slide relative to each other in a third axis. In addition to allowing extrusions to be slid together, some die pattern designs allow extrusions to be snapped together as well as being slid together. Multiple interlocked extrusions may be referred to as a slidably-interlocked bundle.

Figure 18A:
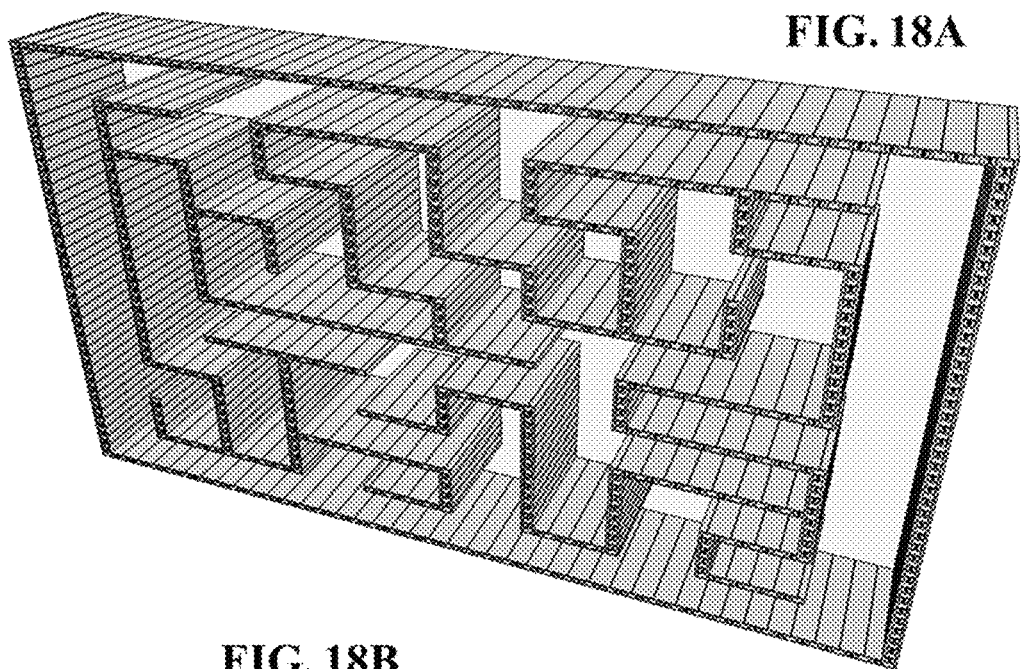
FIG. 18A-FIG. 18B depict furniture maze embodiments.
Figure 18B:
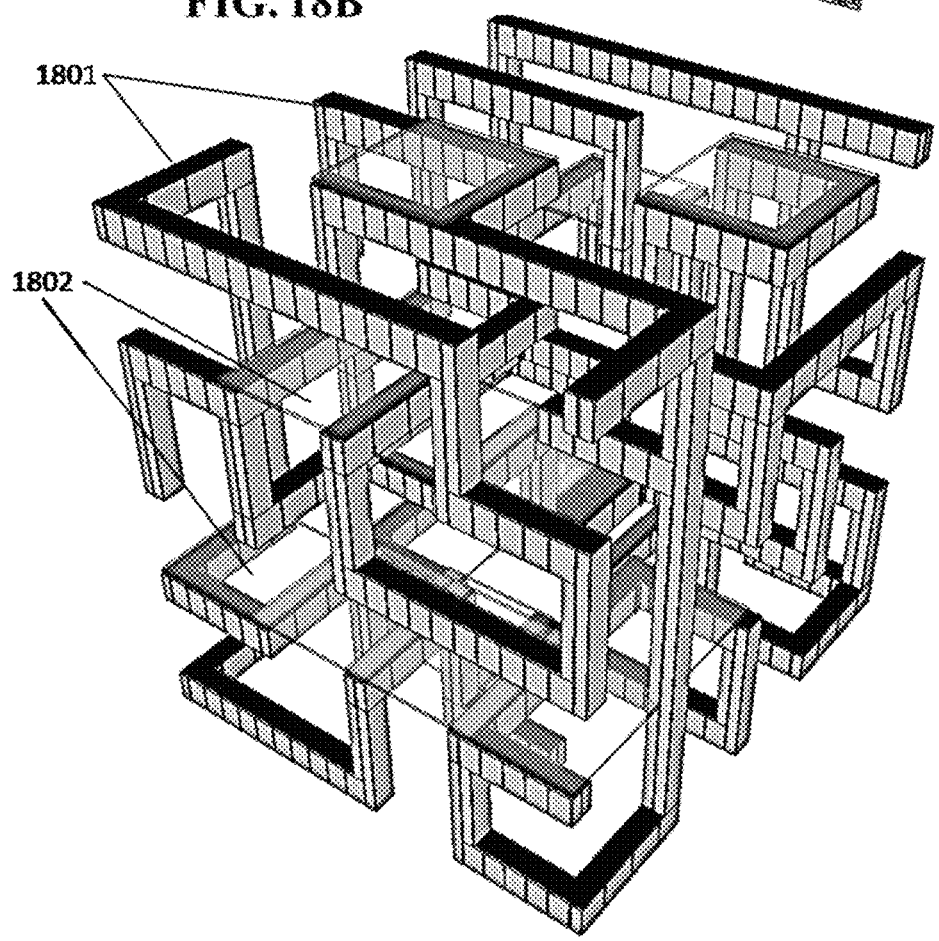

Systems and techniques are described herein for using extrusions of some material having a cross-sectional profile produced by forcing a material through a die of a given die profile, examples of which may be found in the inventor's U.S. Pat. No. 9,222,258 ("the '258 patent") [Wennberg]. The '258 patent describes using extruded cellular blocks having a cross-sectional pattern that when interlocked or otherwise held together with adjacent extruded cellular blocks, may create two or three-dimensional arrays that form structures. FIGS. 18A and 18B of the '258 patent depict an example of extrusions of a basic cell pattern that can form a beam when slid together.

Figure 3A:
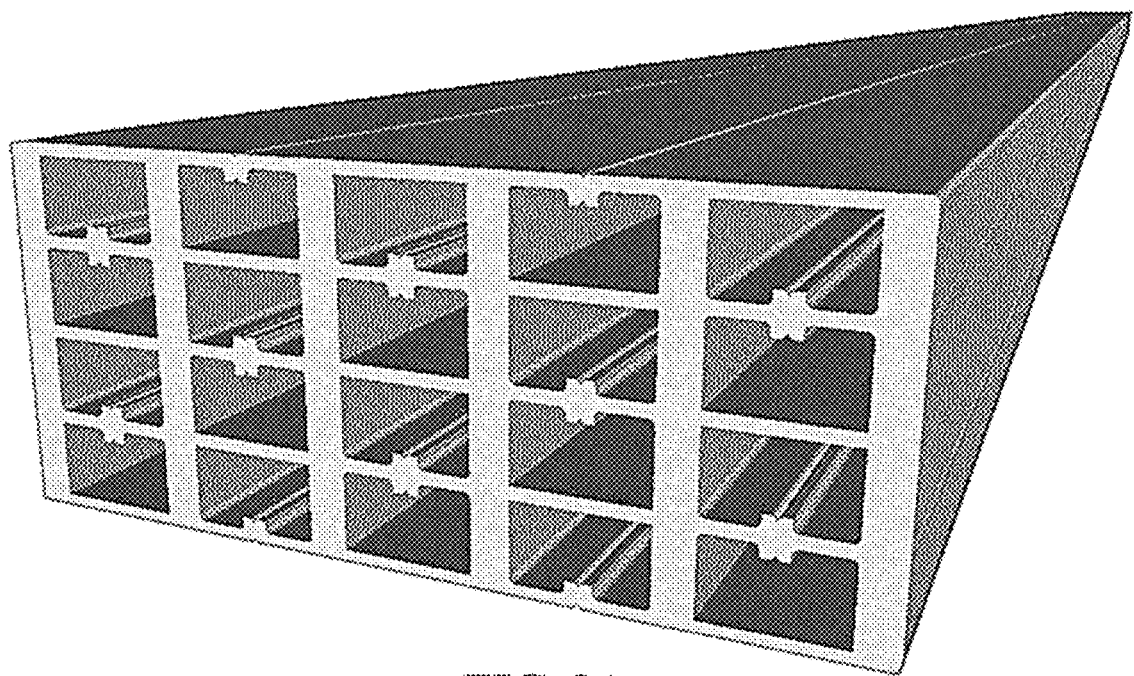
FIG. 3A depicts a bundle of interlocked extrusions of cell patterns used in the rectangular pattern illustrated in FIG. 2B.
Figure 3B:
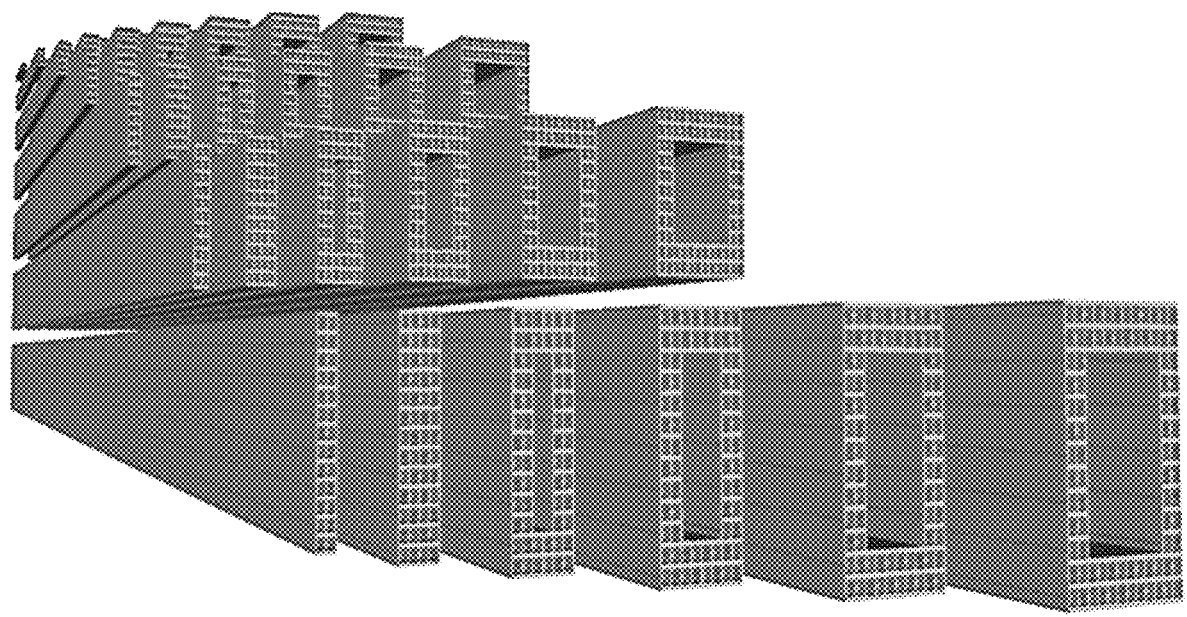
FIG. 3B depicts a variety of rectangular interlocked extrusions of various dimensions, based on the set of elements depicted in FIG. 1B.

Embodiments described herein disclose efficient systems and methods for the application of extrusions of materials having a cross-sectional pattern that enables the assembly of multiple extrusions that form slidably-interlocked bundles. The assembled bundles can be shaped, bound together, and sized into structural components or for the molding thereof to produce a variety of architecturally desirable structures. In some aspects materials extruded from a set of cells derived from elements of a primary cell pattern, may be interlocked to form bundles in rectangular cross-section shapes in any width, thickness and length such as, for example standard 2×4, 2×6, 4×4, 6×6, et al. building construction structures in various dimensions such as shown in FIGS. 3A and 3B.

Figure 4C:
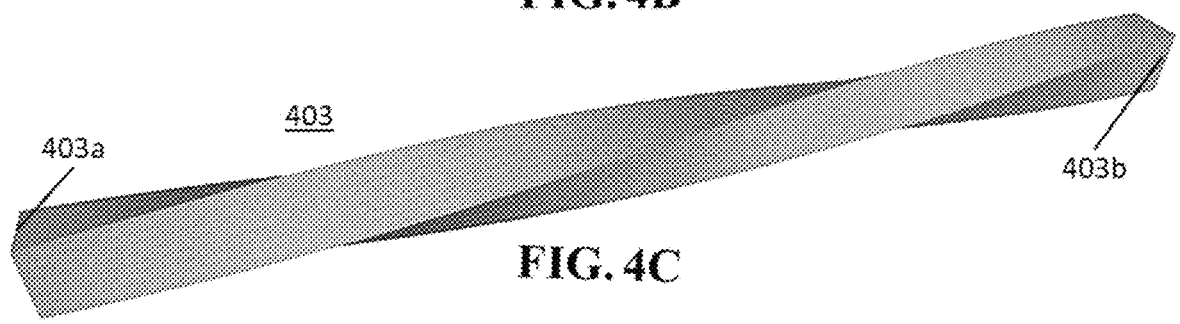
FIG. 4C depicts the structural beam of FIG. 4A with a 180° twist over its length.
Figure 4D:
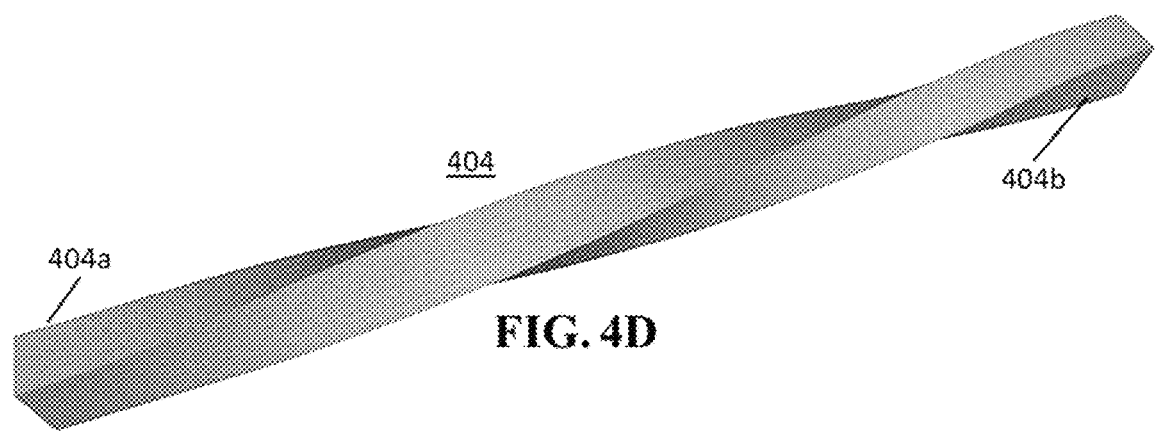
FIG. 4D depicts the structural beam of FIG. 4A with a 180° twist centered at the middle and spanning some of the beam length, with each end being straight for a desired length.
Figure 5E:
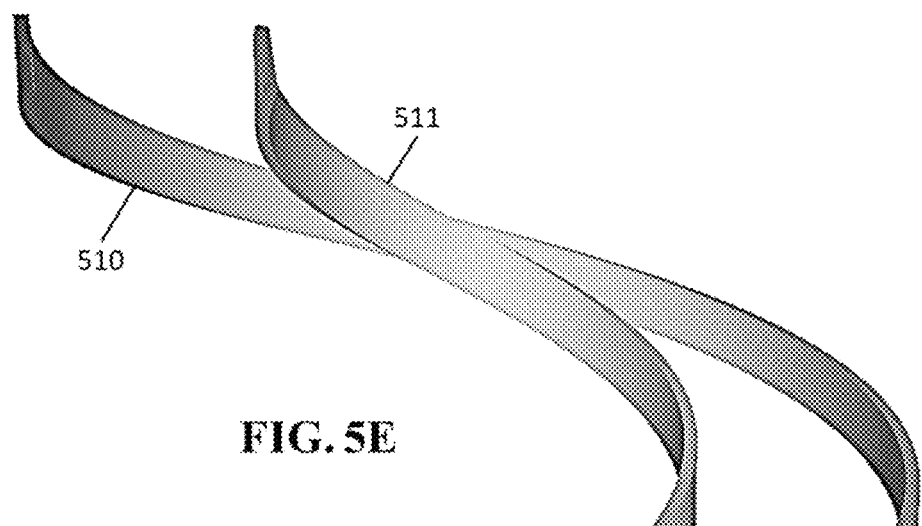
FIG. 5E depicts a set of circular staircase railings based on one of the varieties of rectangular cross-section profile extrusion bundles of FIG. 3B with a twist and bend applied.
Figure 6:
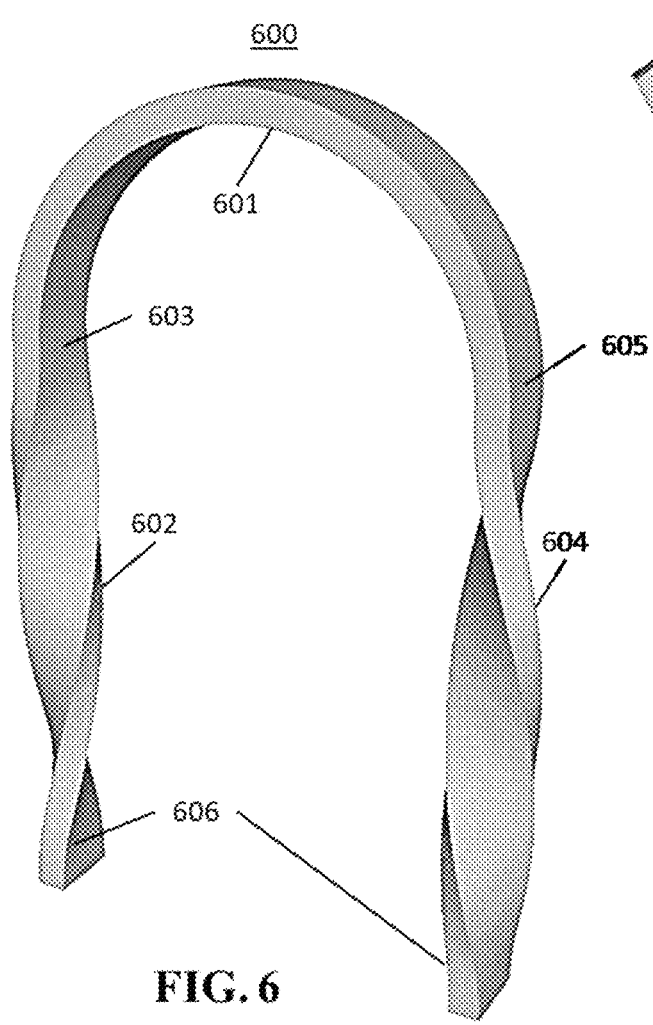
FIG. 6 depicts a structural beam of extrusions combining an arch and twisted posts.

The extrusion cell pattern enables the interlocked extrusion bundles to slide relative to adjacent extrusions in a non-interlocking axis. In some aspects slidably-interlocked extrusion bundles of rectangular shapes may be twisted as illustrated in FIGS. 4C and 4D. In some aspects slidably-interlocked extrusion bundles of rectangular shapes may be bent as illustrated in FIG. 5A and trimmed to form a structural component in the shape of an arch as shown in FIG. 5B. The bent slidably-interlocked extrusion bundles of rectangular shapes shown in FIG. 5A can also be twisted as depicted in FIG. 5C and trimmed to form a structural component in the shape of a twisted arch as shown in FIG. 5D. Spiral shaped forms such as the curved railings depicted in FIG. 5E may be formed by bending and twisting. In some aspects slidably-interlocked extrusion bundles of rectangular shapes may be formed in a U-shaped arch with twisted posts as illustrated in FIG. 6.

Figure 7A:
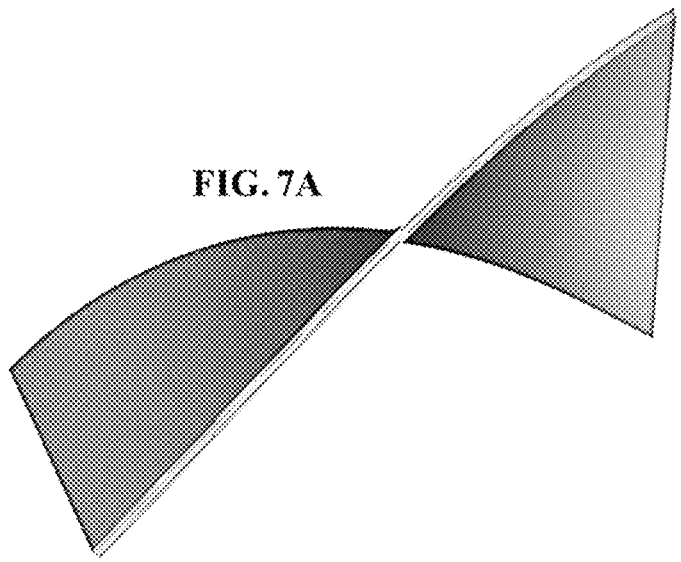
FIG. 7A depicts a planar extrusion structure combining a flat bend and a twist.
Figure 7B:
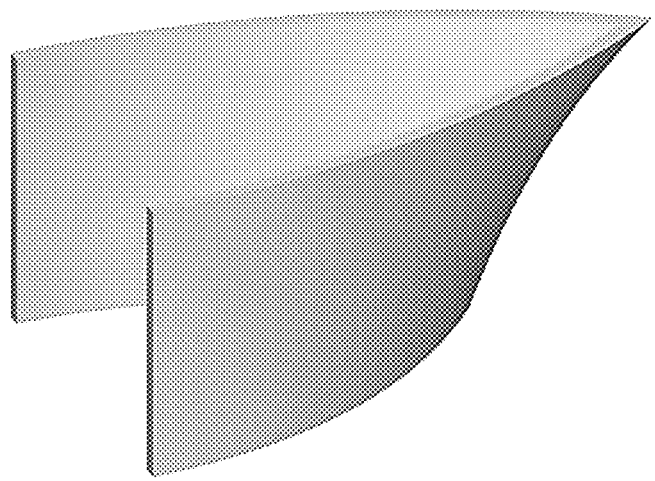
FIG. 7B depicts two planar structures bent and twisted joined to form the bow of a ship.

In some aspects slidably-interlocked extrusion bundles of substantially planar rectangular shapes may be bent, twisted, and trimmed as shown in FIG. 7A. Two such complementary shapes may be joined as shown in FIG. 7B to form the shape of a boat or ship for example.

Figure 8A:
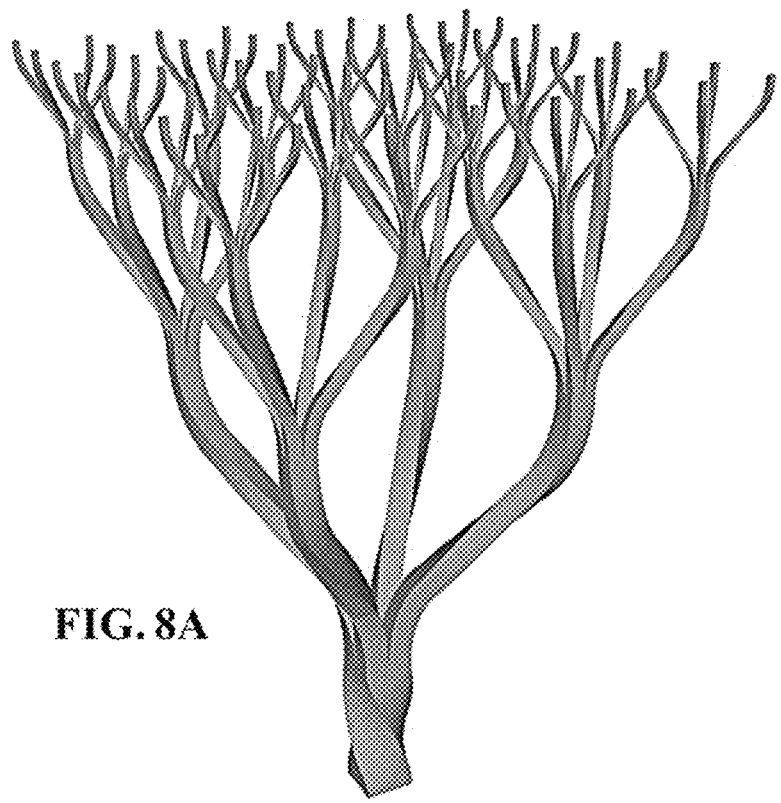
FIG. 8A depicts a tree structure made of structural beam extrusions bent, curved, and twisted with successively smaller branches of structural beam extrusions similarly shaped.

In some aspects slidably-interlocked extrusion bundles of rectangular shapes may be bent, twisted, branched, and trimmed to form tree structures as shown in FIG. 8A. The interlocked extrusion bundles can include conduits for conveying communication cables, power cables, air ducts, water, waste water, et al. to supply channels for consumable resources and waste elimination as depicted in a cross-sectional view of FIG. 8B. Such conduits are anticipated for supplying utility services to a tree-house building mounted atop a tree structure as illustrated in FIG. 8E, Variations of bent, twisted, branched, and trimmed tree structure formations are depicted in FIG. 8C and FIG. 8D.

Figure 9A:
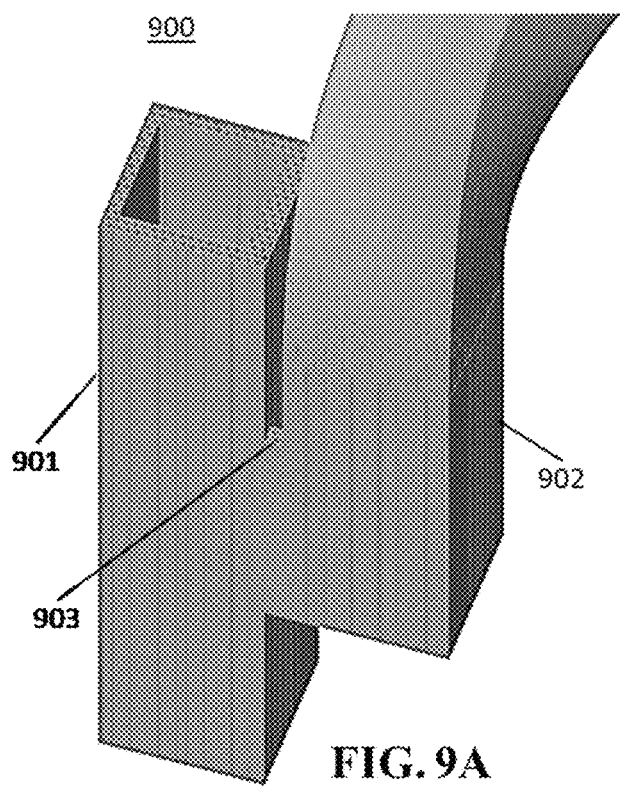
FIG. 9A depicts a first beam with a second beam attached to its side.
Figure 9B:
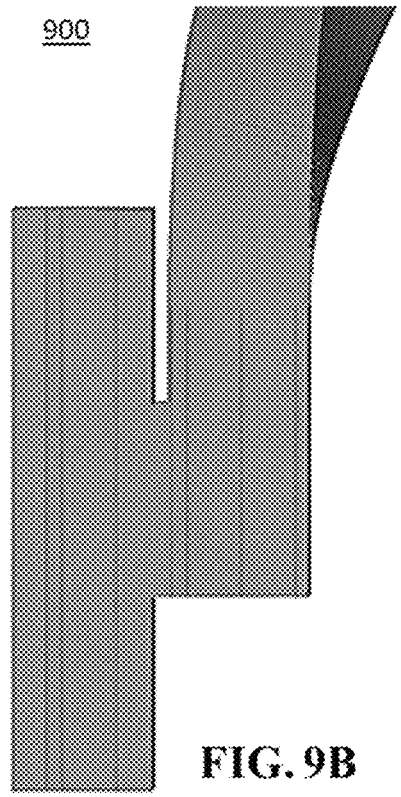
FIG. 9B depicts the side-connected beams of FIG. 9A from a front perspective.
Figure 9C:
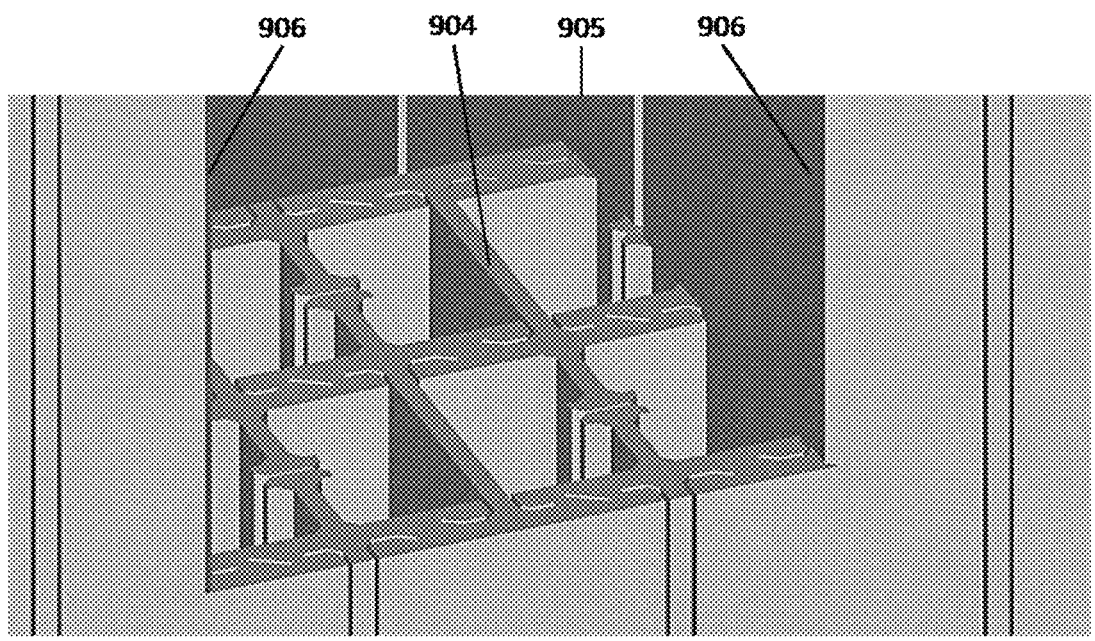
FIG. 9C depicts a view of the side attachment opening of the first beam of FIG. 9A.
Figure 11:
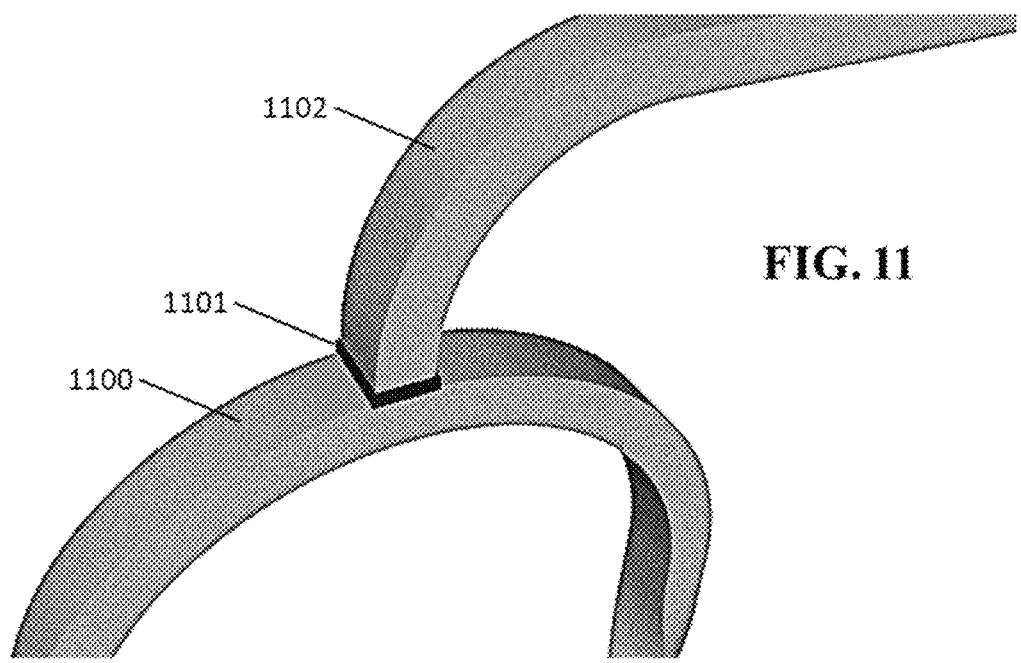
FIG. 11 depicts the arch with twisted posts of FIG. 6 with a beam attached at the top.

In some aspects slidably-interlocked extrusion bundles may accommodate side attachments as depicted in the rectangular-shaped extrusion bundles shown in FIG. 9A, and FIG. 9B. FIG. 9C illustrates an opening in the vertical rectangular structural component of FIG. 9A and FIG. 9B depicting the extrusion bundle lengths cut to provide a support the attachment depicted in FIG. 9A and FIG. 9B. FIG. 10A-FIG. 10D depict side attachments of extrusion bundles for connecting structural vertical fence posts together with horizontal post bracing beams. FIG. 11 depicts a structural component attached to the top of the U-shaped arch with twisted posts as shown in FIG. 6

Figure 12:
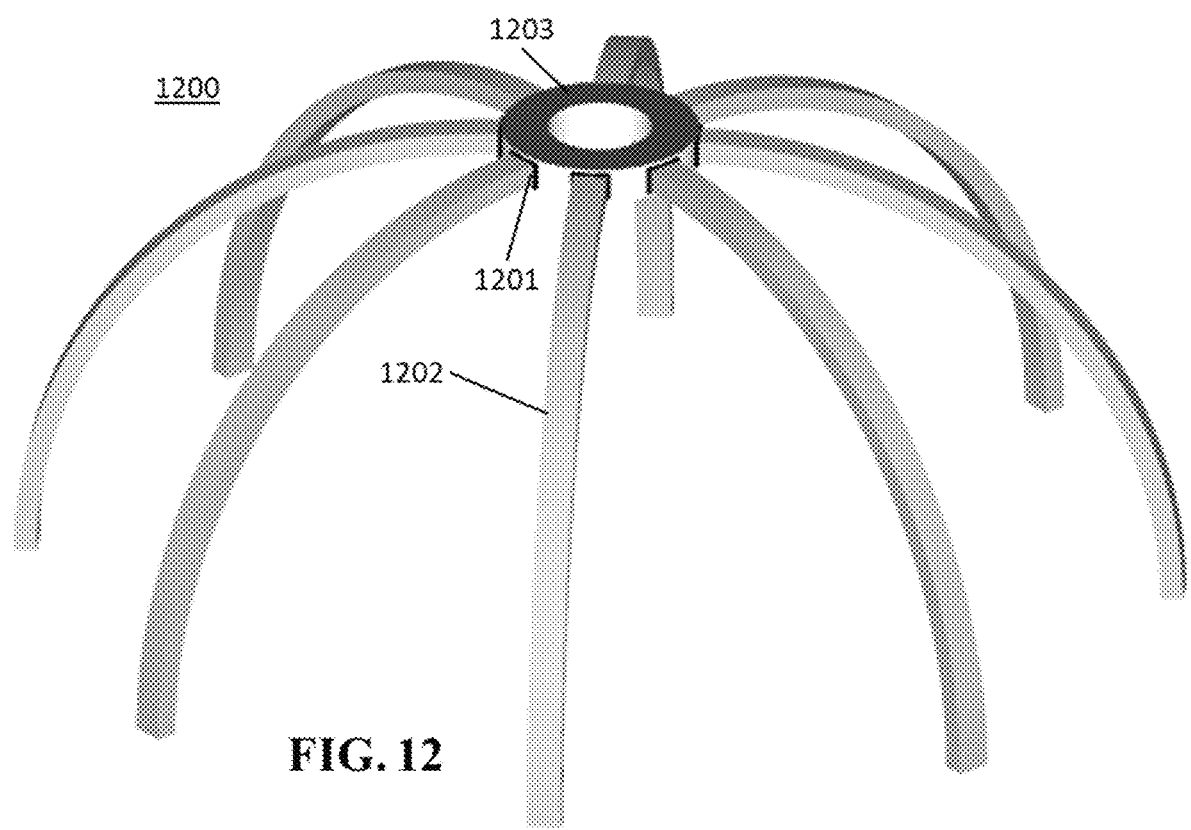
FIG. 12 depicts a dome frame of bent extrusion beams attached to a compression ring.

In some aspects slidably-interlocked extrusion bundles of rectangular shapes may be bent to form arcuate beams that are attached at one end to a compression ring as depicted in FIG. 12.

Figure 13C:
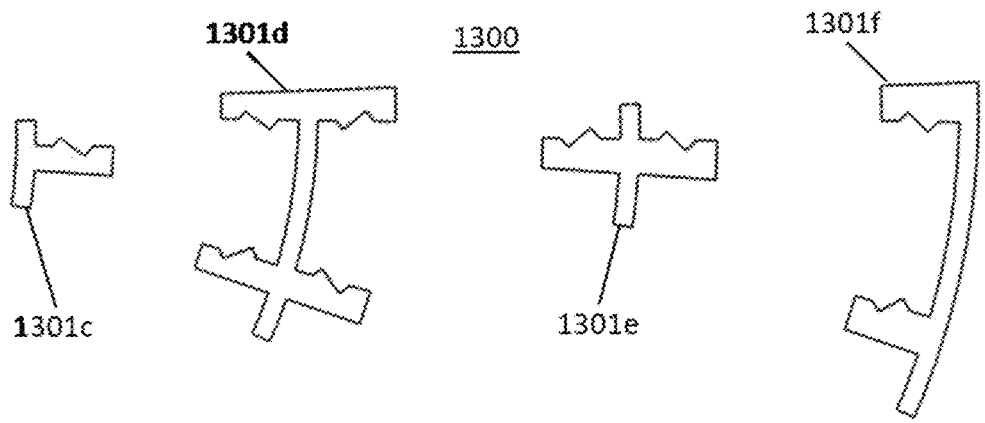
FIG. 13C illustrates how extrusions of the set of cell patterns depicted in FIG. 13A and derivative cell patterns depicted in FIG. 13D are interlocked to form a semi-cylindrical structural component.

In some aspects slidably-interlocked extrusion bundles of arcuate shapes extruded from the set of cell patterns depicted in FIG. 13A may be assembled to form cylindric shaped structural components such as depicted in FIG. 13B. Slidably-interlocked extrusion bundles of cylindrical shapes can be formed in single or multiple layers to produce thinner or thicker walled cylinders. Slidably-interlocked extrusion bundles of cylindrical shapes can be used as a structural compression ring with openings for attaching the arcuate beams as depicted in FIG. 12. Further, slidably-interlocked extrusion bundles of arcuate shapes extruded from the set of cell patterns depicted in FIG. 13A may be assembled to form partial cylinders with edge extrusions made from cell patterns depicted in FIG. 13C such as the half-cylinder structural component depicted in FIG. 13D.

Figure 14:
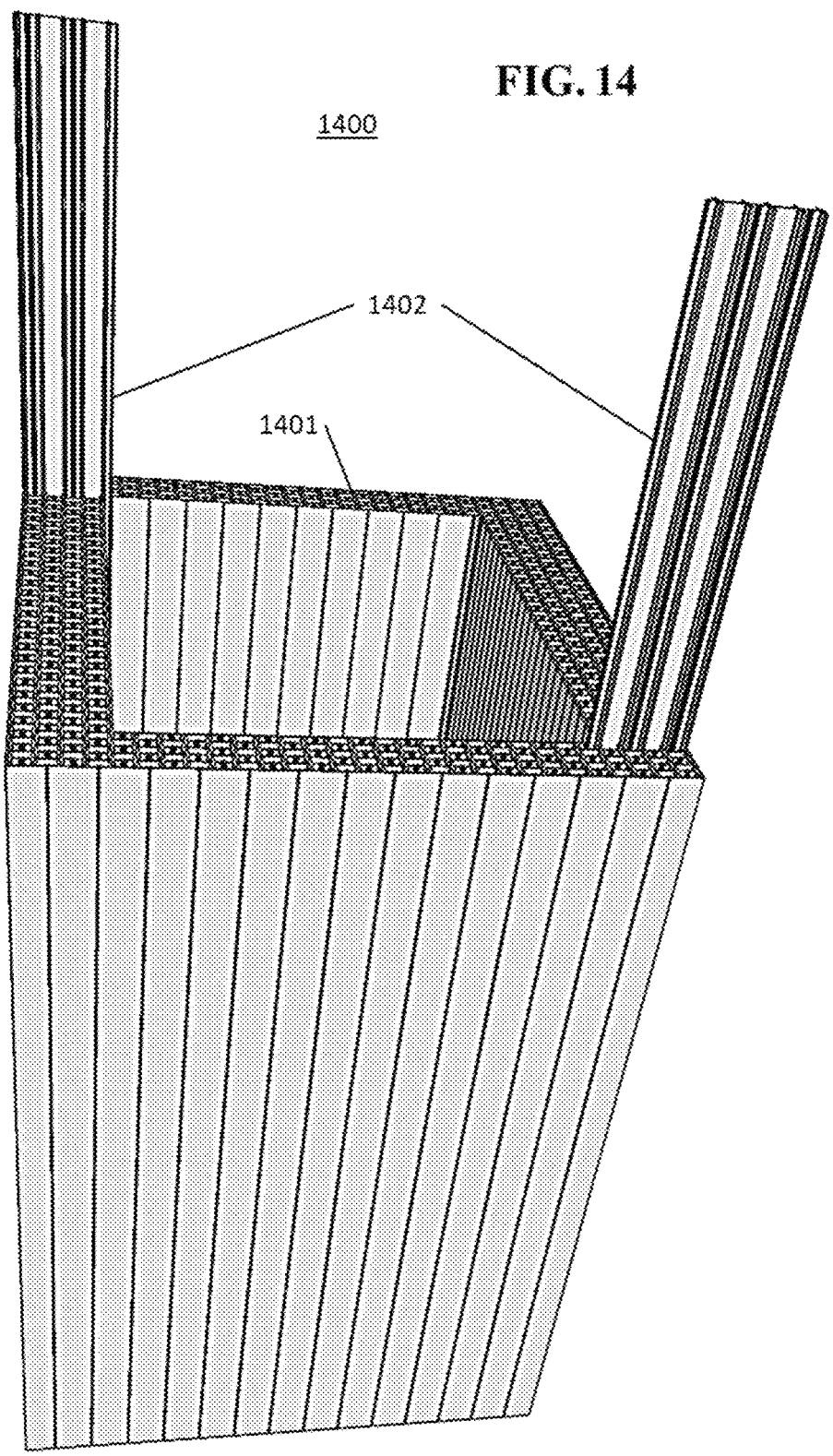
FIG. 14 depicts a structural box of extrusions for use as a mold.

In some aspects slidably-interlocked extrusion bundles of rectangular or cylindrical shapes may be formed to create a mold for casting materials within the enclosed bundle of extrusions depicted in rectangular form in FIG. 14. The subsets of extrusion bundles extending above other extrusions can be slidably removed to extract the molded material after it has cured.

Figure 15A:
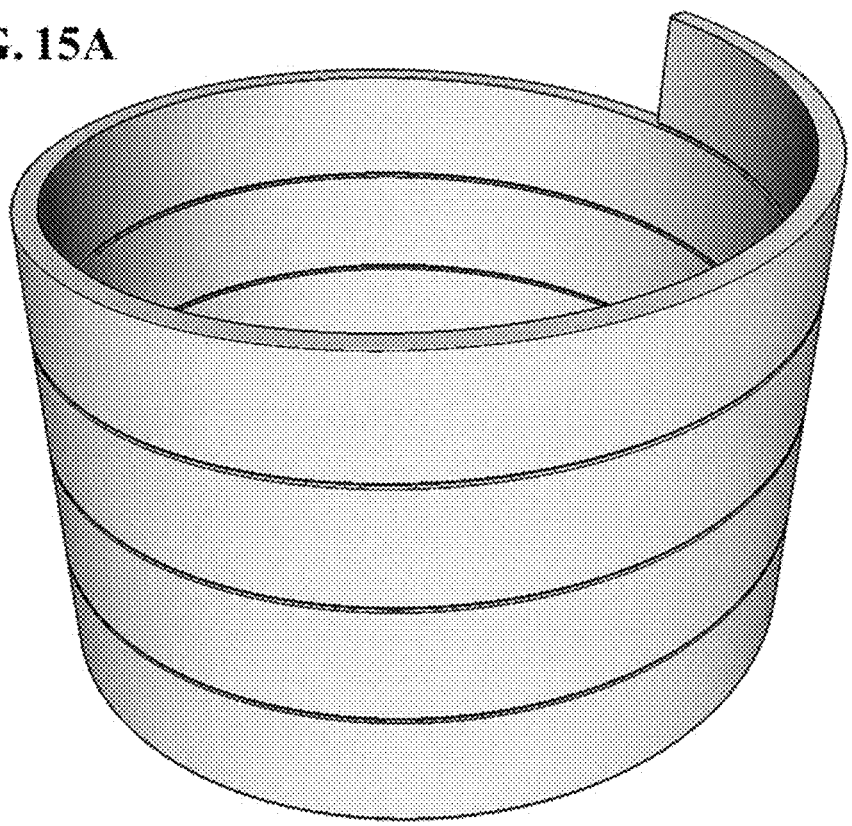
FIG. 15A depicts a twisted, bent cylinder structure.
Figure 15B:
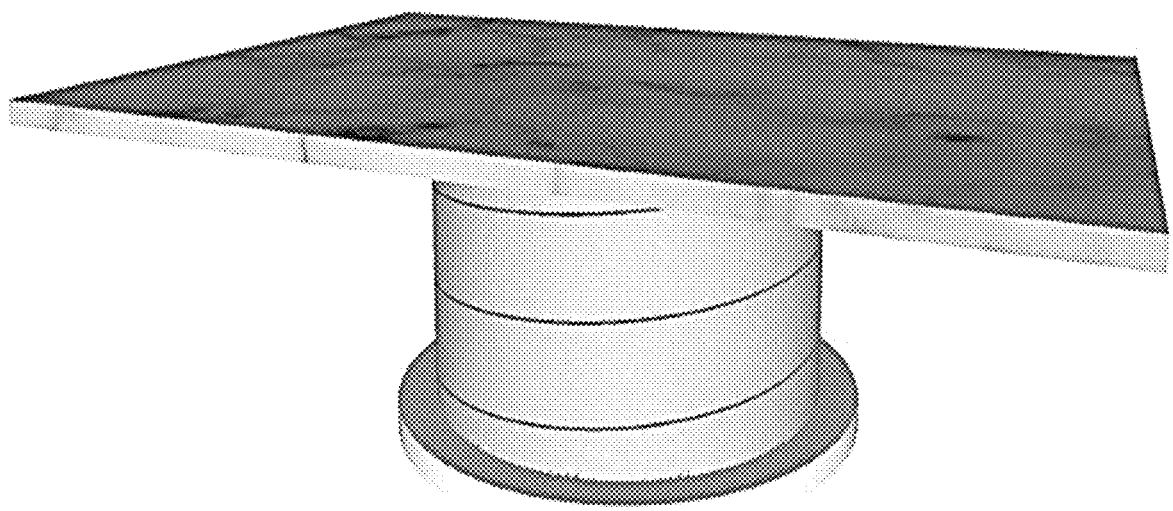
FIG. 15B depicts a table embodiment made with a cylindrical table support.

In some aspects slidably-interlocked extrusion bundles of rectangular cross-sections can be shaped by bending and twisting into cylindrical forms such as depicted in FIG. 15A, and cut on the ends to facilitate mounting upon a base and accommodating the attachment of a planar surface to its top such as depicted in FIG. 15B.

Figure 16A:
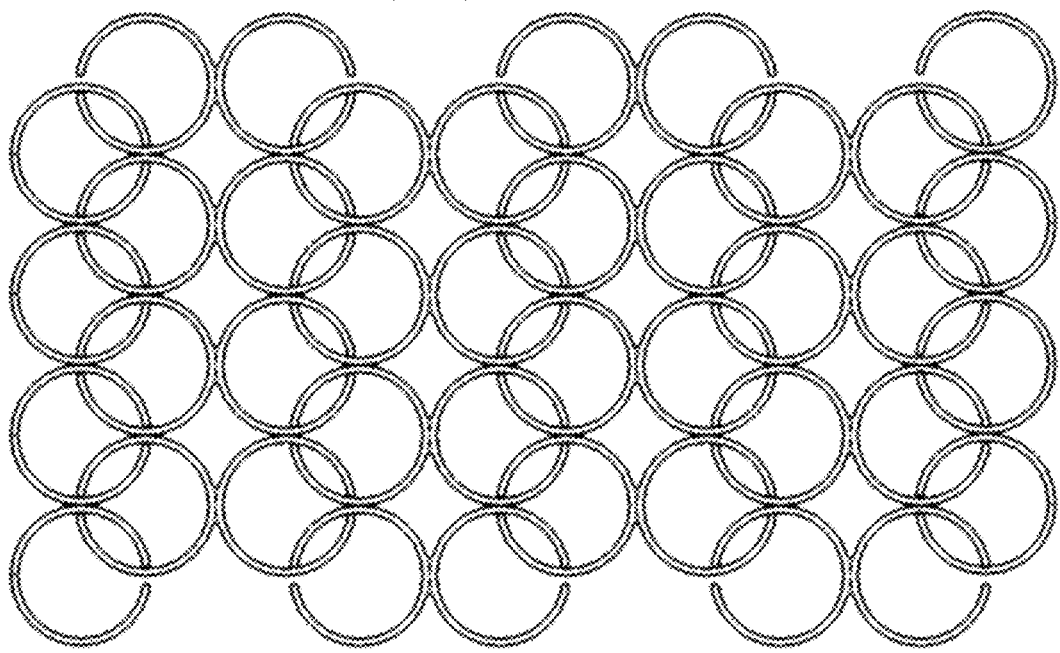
FIG. 16A and FIG. 16C depict slidably-interlocked extrusions made from a tube cell.
Figure 16B:
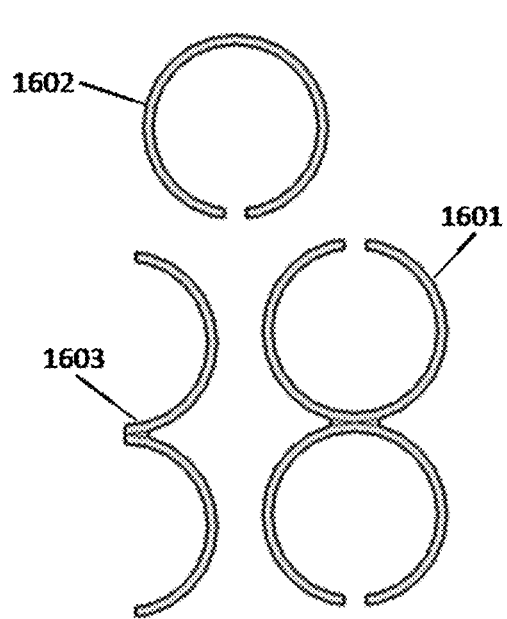
FIG. 16B depicts a complete family of tube cell profiles
Figure 16C:
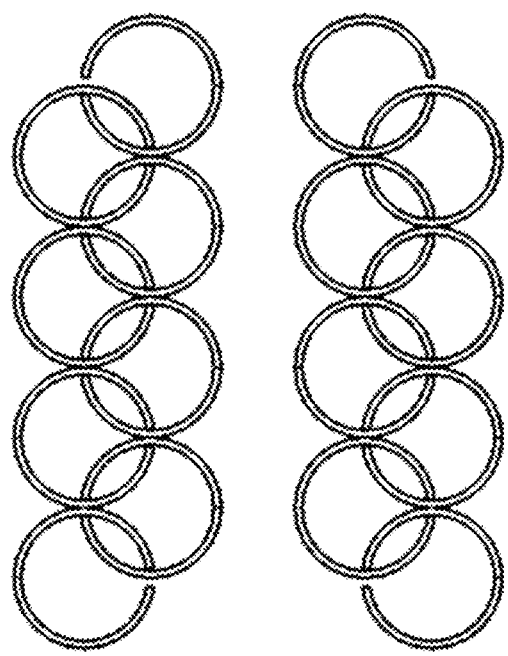

In some aspects slidably-interlocked extrusion bundles of circular extrusions made from the set of cell patterns depicted in FIG. 16B may be assembled to form simple interconnected bundles such as depicted in FIG. 16A and FIG. 16C.

Figure 1A:
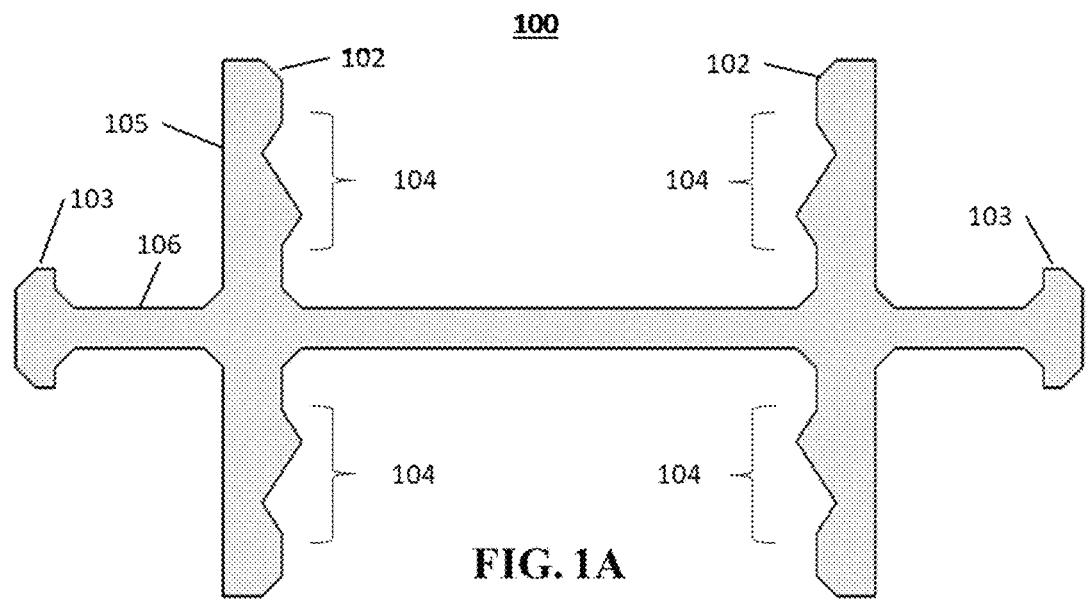
FIG. 1A depicts a basic cell pattern for extrusions that can be slidably interlocked.
Figure 1B:
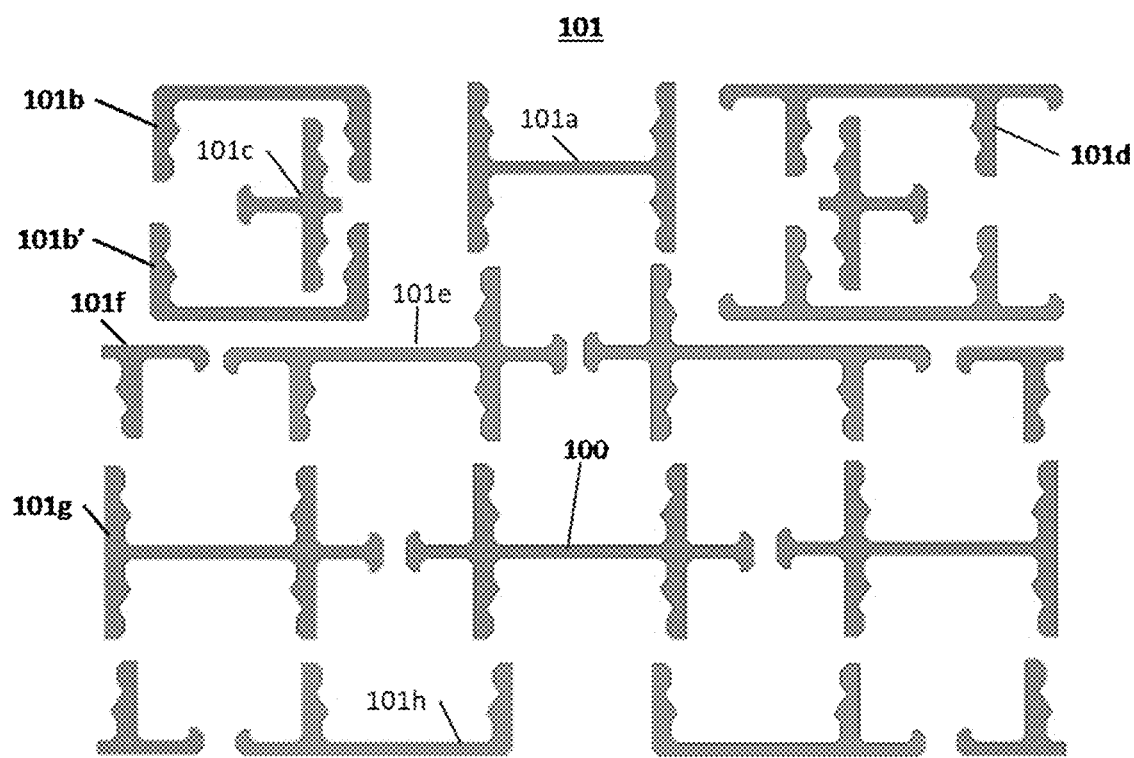
FIG. 1B depicts a set of elements of the basic cell pattern of FIG. 1A that include interlockable peripheral edge cells.

In some aspects interlocked extrusion bundles made of extrusions based on cell profiles illustrated in FIG. 1B, that may be slid or snapped together to form blocks of various lengths that can be attached to other blocks to create geometric shapes such as the two-dimensional (2D) maze depicted in FIG. 17A and the three-dimensional (3D) maze depicted in FIG. 17B. Similarly, when scaled to larger dimensions, 2D and 3D artistic geometric maze display cases may be created such as depicted in FIG. 18A and FIG. 18B.

Figure 20:
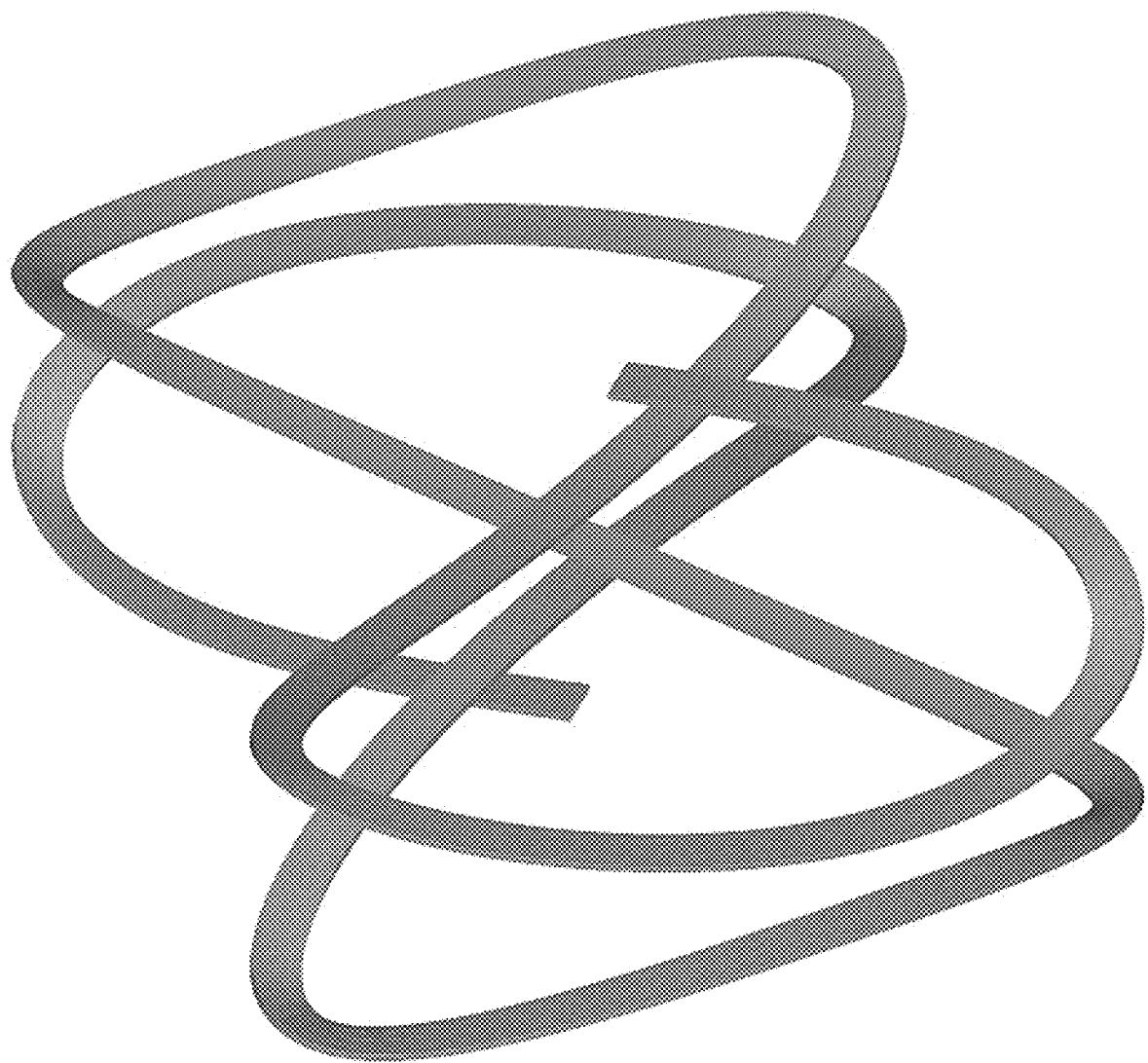
FIG. 20 depicts a Lissajous roller coaster structure.

In some aspects slidably-interlocked extrusion bundles of rectangular shapes may be bent and twisted as illustrated in FIG. 20, to form a curvy, Lissajous rollercoaster structural track for artistic or entertainment structures.

The architectural structures and structural components described herein are for exemplary purposes and are not to be considered as limiting in any manner related to the application of interlock extrusions and slidably-interlocked extrusions to produce shaped structural components.

Creating a bundle of slidably-interlocked extrusions requires selection of a cell profile or a set of cell profiles derived from a primary cell profile for producing extrusions that are compatible for being interlockable with each other in two dimensions and slidable relative to adjacent extrusions in a third dimension. FIG. 1A illustrates an example of a primary cell profile 100 with arms 105 having slidably interlocking patterns 104 that when extrusions having this cross-sectional pattern are joined at the interlocking patterns 104, are locked in both the x-axis and y-axis due to the pattern's mirror symmetry in both axes. Extrusions of cell profile 100 may be slid together or snapped together to form bundles of slideably interlocked extrusions. Chamfered ends 102 of interlocking patterns 104 of arms 105 facilitate snapping together extrusions of primary cell profile 100. Abutments 103 at the x-axis ends of the legs 106 of primary cell profile 100 allow for small movement between extrusions of cell profile 100 while supporting or transmitting a load between adjacent interlocked extrusions.

FIG. 1B illustrates a complete set of derivative cell profiles 101 including their symmetrical rotations, based on primary cell profile 100 also included in the set. The eight unique derivative cell profiles 101a-101h are identified in FIG. 1B and those not identified with a reference are symmetrical rotations of the referenced cell profiles. The symmetrical rotation of derivative cell profile 101b is referenced as 101b' as an example of the symmetrical rotation. Extrusions from the set of derivative profiles 101 can be interlocked at the outer layers of interlocked extrusion bundles to add outside and inside flat surfaces, hollows, and corners to finish a structural component or subcomponent. The cross-section of an interlocked bundle may take a variety of forms such as, but not limited to, substantially rectangular, circular, cross-shaped, partial forms, and may be fully filled with extrusions or may feature hollow interiors or channels as well as other voids.

Figure 2A:
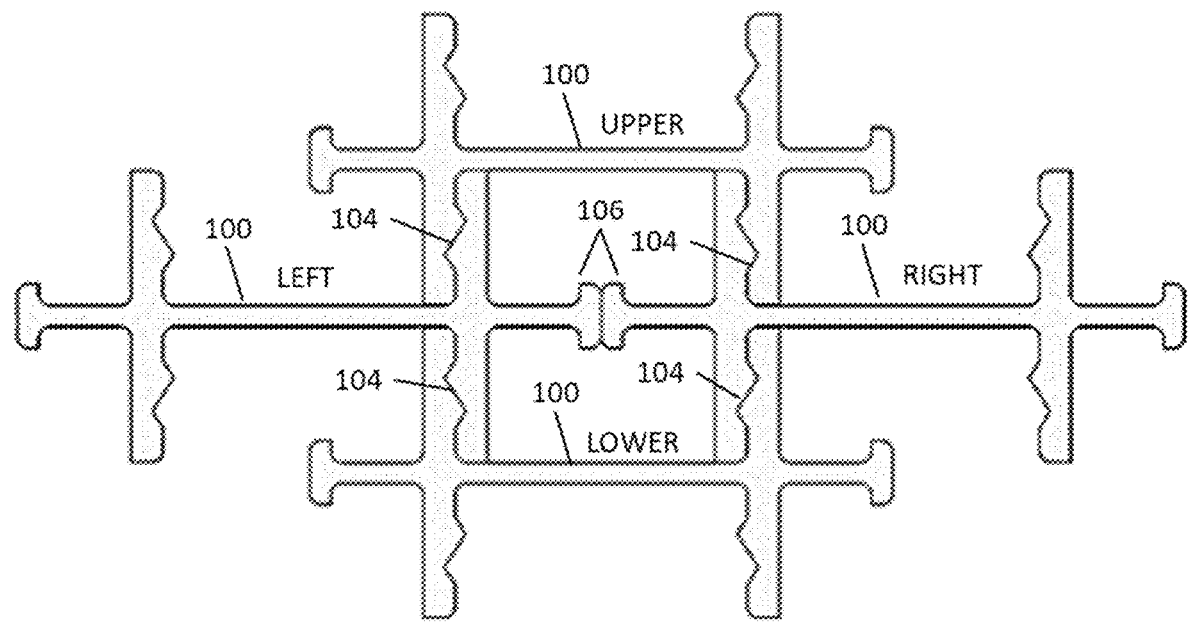
FIG. 2A illustrates how four of the cell patterns of FIG. 1A interlock with each other.

FIG. 2A illustrates a cross-sectional view of how four extrusions of the primary cell profile 100 may be assembled to form an interlocked bundle of extrusions. The abutments 106 on the ends of left and right extrusions are in contact to drive and maintain engagement of locking patterns 104 of the left and right extrusions with the complimentary locking patterns 104 of the upper and lower extrusions.

Figure 2B:
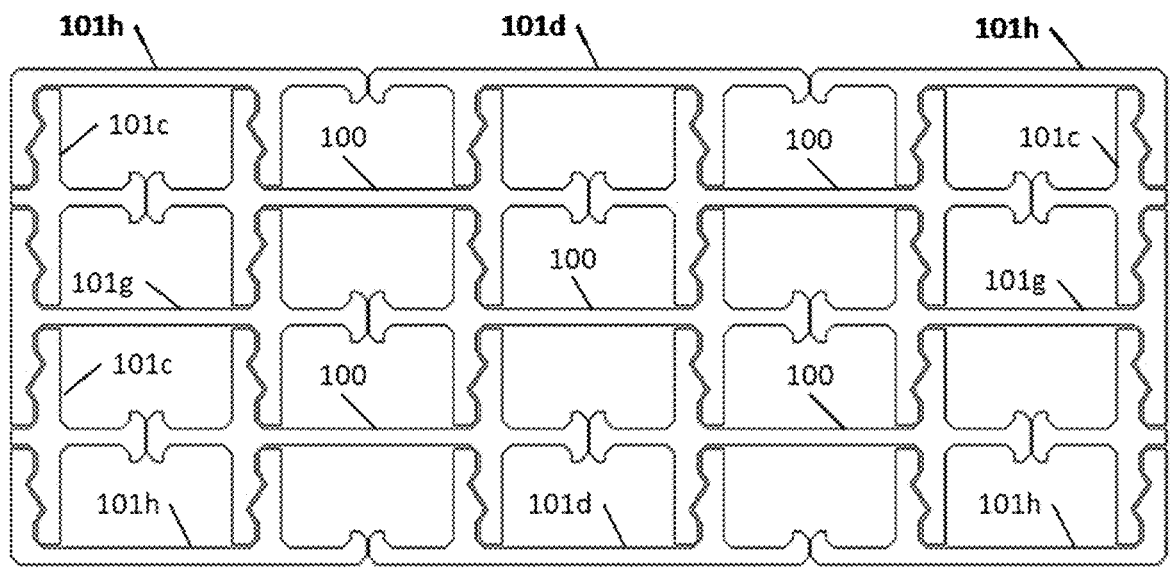
FIG. 2B illustrates how elements chosen from the set of cell patterns depicted in FIG. 1B are interlocked in a rectangular pattern.

FIG. 2B shows an assembly of extrusion cells from the set of cell profiles 101 based on the primary cell profile 100 into a pattern with an aspect ratio of a standard 2-by-4 piece of building lumber (a.k.a. stud). The edge cell profiles 101c, 101d, 101g, and 101h in FIG. 2B are drawn from the set of derivative cell profiles 101 illustrated in FIG. 1B. The contact tolerances between adjacent interlocking extrusions made from the set of cell profiles 101 determines the amount of sliding friction between interlocked extrusions. Small adjustments to dimensional aspects of select features of cell profiles from the set of cell profiles 101, such as the thickness of arms 105 and the length of legs 106, may result in substantial changes in the amount of sliding friction between interlocked extrusions made from the adjusted cells.

The primary cell profile 100 depicted in FIG. 1A and the set of cell profiles 101 depicted in FIG. 1B derived from a primary cell profile 100 meet the basic requirement that they must be extrudable. Some factors to consider for using slideably interlocked extrusions for structural components based on the depicted cell profile 100 is that the legs 106 should have substantially the same cross-sectional width for each extrusion in a bundle. The size of abutments 103 at the ends of legs 106 affects the amount of resistance to bending or twisting and affects the amount of force that can be exerted at the interface where extrusion abutments 103 contact adjacent extrusion abutments 103 touch without losing integrity. Contact tolerances between each interlocked extrusion in the bundle determines the amount of friction between interlocked extrusions that will be exerted as (i.e., how hard or easy) the extrusions slide against each other.

The interlocking patterns 104 of arms 105 of primary cell profile 100 allows for connected extrusions to be pulled apart as well as slid apart. This feature may be helpful for making design changes while prototyping a shaped scale-model structural component of slidably-interlocked extrusions. This extrusion profile is highly compatible with the use of materials such as polyvinyl chloride (PVC), but other plastics and other materials such as, but not limited to aluminum, pultruded composites, extrudable wood-resin compounds, et al. may also be suitable for making structural components of slidably-interlocked extrusion bundles. Alternative profiles such as those depicted in the '258 patent can allow extrusions to be snapped together and can be slid apart but cannot be pulled apart.

FIG. 3A illustrates a bundle of slidably-interlocked extrusions made from cells based on the cell profiles depicted in the arrangement shown in FIG. 2B and assembled to form the rectangular cross-section shape of a standard 2-by-4 structural building component. Adjustments to dimensional aspects of select features of the cell profiles used to produce the cells may be made for extruding a given material that when interlocked with other extrusions, meet specific slidability (e.g., friction) requirements for a given application. The friction between adjacent interlocked extrusions in a bundle is inversely proportional to the clearance tolerance between contacting surfaces. For example, structural component applications requiring minimal bending would likely use cells that produce low contact clearances between adjacent interlocked extrusions. Structural component applications that specify shaping the component by bending or twisting would likely use cells that produce higher contact clearances between adjacent interlocked extrusions.

FIG. 3B depicts a series of rigid interlocked extrusions of rectangular cross-section aspect ratios of structural building components in sets of varying lengths representing the equivalent set of standard structural building components made from wood. The larger structural components commonly referred to as "beams," are depicted with hollow interiors that depending on the extrusion material used may be lighter and stronger than equivalent standard lumber beams. Increasing the strength of the rigid interlocked extrusions beams can be accomplished by filling in the hollow center with additional interlocked extrusions as necessary to meet the required structural integrity. This minimizes the amount of material required to make a structural building component that meets a given strength requirement, that may be significantly lighter and cost less than commonly used building components.

Figure 4A:
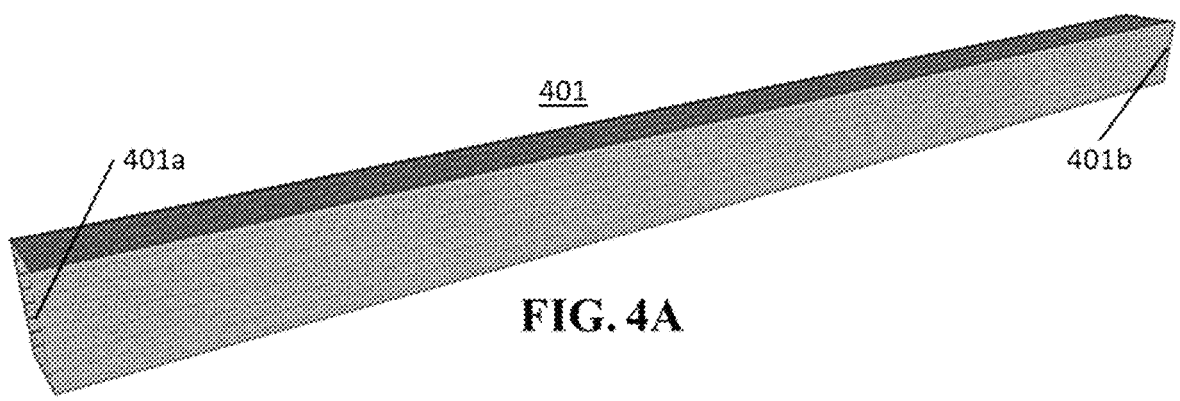
FIG. 4A depicts a straight structural beam of interlocked extrusions.
Figure 4B:
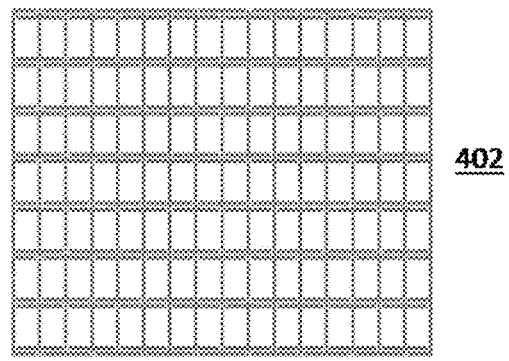
FIG. 4B depicts the cross-section profile of the structural beam of FIG. 4A.

FIG. 4A depicts an example of a straight structural component 401 comprising a bundle of slidably interlocked extrusions to form a rectangular cross-section beam or post shape. Applying an adhesive to ends 401a and 401b will prevent the interlocked extrusions from sliding and as a result, becomes a rigid structural component. FIG. 4B illustrates a grid pattern of the cross-section of the slidably interlocked extrusions 402 within the straight structural component 401 that when bound to each other by the application of an adhesive or other binding agent, are prevented from sliding. One approach to applying adhesives to a structural component may be accomplished by dipping the ends of the structural component in a tray containing a low viscosity liquid adhesive (e.g., cyanoacrylate, epoxy, glue) or other binding agent (e.g., acetone) to a level that allows the adhesive to reach several centimeters into the bundle of extrusions by capillary, wicking, or other coating action to bind the interlocked extrusions together. Binding agents such as acetone, that when applied to extrusions of plastic materials (e.g., ABS, PVC) cause the surface of the plastic material to temporarily soften and bond with adjacent extrusions of the same material. As the binding agent evaporates, the bonded adjacent plastic extrusions are permanently bound together. Other means of binding extrusion bundles together may made with, for example but not limited to, fasteners appropriate for locking multiple adjacent extrusions to prevent sliding. Extrusions of materials that are difficult to glue (e.g., polyethylene) may be effectively bound by the application of grit between the slidable surfaces of adjacent extrusions, and may be effectively snapped rather than slid together to form bundles into structural components.

FIG. 4C depicts the straight structural component 401 of FIG. 4A twisted 180 degrees with ends 403*a* and 403*b* finished in a squared-off cut and glued with an adhesive binding agent applied to ends 403*a* and 403*b* to bind the interlocked extrusions together for the component to permanently retain the twist to create the twisted beam 403 structural component. One method for twisting the structural beam of FIG. 4A is to glue end 403*a* to bind the interlocked extrusions together and clamp glued end 403*a* in a first stationary fixture. At end 403*b* of the beam apply a torque at a ninety-degree angle from the long axis to form the desired twist angle and clamp the torqued end 403*b* in a second stationary fixture to prevent relaxation of the twisted interlocked extrusion bundle. Twisting or bending forces cause the bundle of extrusions to flex and slide relative to each other, resulting in uneven lengths of individual extrusions at the end 403*b* that was not bound with glue, and clamped in the second stationary fixture. The end 403*b* of the beam at the second fixture may be cut beyond the overhanging lengths of extrusions to reach the desired length for the finished structural component, and the interlocked extrusions at the cut end 403*b* being bound with the appropriate binding agent for the material used in the extrusions.

Bundles having large cross-sections may be difficult to bend or twist. This can be addressed by creating a small cross-sectioned, seed bundle that can be bent or twisted and bound together. The desired large cross-sectional size of bundle may be completed by sliding additional extrusions onto the seed bundle as required to complete the structural component.

FIG. 4D depicts a variation of twisted beam 403 that features normalized ends 404*a* and 404*b* that begin with a zero-twist angle and may extend for a short length that is not twisted. The ends 404*a* and 404*b* may be forced to maintain a zero-twist angle by clamping the beam from the ends 404*a* and 404*b* to a desired length (e.g., 1 cm, 10 cm) while applying torque to twist the beam at the desired angle. Applying an appropriate binding agent to ends 404*a* and 404*b* for the desired length ensures that the normalized ends do not twist when the clamps are removed from the normalized twisted beam 404. Twisted beams with normalized ends 404*a* and 404*b* such as normalized twisted beam 404, may provide an improved connection continuity with another beam having a zero-twist angle for example, or an improved fit into commonly used attachment hardware to secure an end of the beam to another structure (e.g., concrete pad, ceiling joist).

FIG. 5A depicts a structural component such as straight structural component 401 comprising a bundle of slidably interlocked extrusions that has been bent into the shape of a structural arch 501. To form structural arch 501, the interlocked extrusions of squared end 505 of the beam being bound with an appropriate binding agent, and bound end 505 being clamped in one stationary fixture while a bending torque was applied to the other end of the beam. The bending results in uneven lengths of individual extrusions at the unbound end 506 due to the differential bend radius between the inside and outside surfaces of the bundle of extrusions in the structural component. When the unbound end is clamped in a second stationary fixture, evenly cut to a desired length, and bound with a binding agent, the structural arch 502 with squared cut ends 507 and 505 depicted in FIG. 5B is produced.

FIG. 5C and depicts a bent structural arch such as structural arch 501 of FIG. 5A, but with the added application of a twisting torque to produce twisted arch 503 having bound end 505 and unbound end 506 with uneven lengths of individual extrusions. Following a process similar to that described in producing structural arch 502 above, the unbound end 506 is clamped in a second stationary fixture, evenly cut to a desired length, and bound with a binding agent, the twisted structural arch 504 with squared cut ends 507 and 505 depicted in FIG. 5D is produced.

FIG. 5E depicts a bundle of slidably interlocked extrusions assembled in a rectangular cross-section and shaped to form handrail structural components for installation on a circular staircase. Outside handrail 510 may be formed by wrapping the slidably interlocked bundle of extrusions around a cylinder having a radius similar to the outer radius of the staircase and pulled up in a rising spiral consistent with the staircase step pitch. Inside handrail 511 is similarly formed based on a cylinder having a radius similar to the inner radius of the staircase.

FIG. 6 depicts a U-shaped structural arch 600 comprising bent arch 601 atop left-hand twisted structural post 602 and right-hand twisted structural post 604, both posts featuring normalized ends 606 as described in references to FIG. 4D. U-shaped structural arch 600 may be formed from one long bundle of slidably interlocked extrusions starting with creating the bent arch 601 section by bending around a cylindrical form or a jig with rigid pins arranged to approximate the cylindrical bend radius, and applying a glue or other appropriate binding agent to the interlocked extrusions at transition points 603 and 605. One technique for applying a binding agent at these points might use access channels from the outer cover extrusion pieces to the interior interlocked extrusions that allow the binding agent to be forced or wicked into areas where extrusions slide relative to adjacent extrusions. Clamping the bent arch 601 at points 603 and 605 to a stationary fixture will allow structural posts 602 and 604 to be twisted by the application of torque at ends 606 to form left and right twists respectively. Structural post ends 606 are clamped in a second stationary fixture, evenly cut to a desired length, and bound with a binding agent, and square-cut ends 606 to finish the U-shaped structural arch 600 as shown in FIG. 6.

Alternatively, U-shaped structural arch 600 may be created by assembling separately made components bent arch 601, twisted structural post 602, and right-hand twisted structural post 604 as described in references to FIGS. 5A, 5B, and 4D. Twisted structural posts 602 and 604 may be attached to bent arch 601 by gluing or otherwise bonding the ends of bent arch 601 to mating ends of structural posts 602 and 604 at points 603 and 605.

Other structural components may be made from substantially planer bundles of slidably interlocked extrusions having a wide rectangular cross-section to form flat structural components that may also be bent or twisted for various applications. FIG. 7A depicts a flat structural component curved and twisted as shown. Application of such flat structural components may be used to create large structures when joined together by high-strength joiner components made of materials such as carbon fiber, titanium, high-strength steel, et al. FIG. 7B depicts a large structure made of bundled extrusions in flat profile structural components shaped by twisting or bending and joined with a high-strength component to form the shape of a ship's bow hull.

FIGS. 8A, 8C, and 8D depict variations on how bundles of slidably interlocked extrusions can be extended with branching extrusion bundles to form robust tree-like structures. Branching extrusion bundles split away from a larger bundle to extend in a new direction creating a gap where extrusions interlocked with the larger bundle end to allow the branching subset of extrusion bundles to bend away in the new direction. By staggering successive extrusions of a given length of slidably interlocked extrusions each bundle of extrusions reaching the tree top has a continuous path to the bottom of the tree. The application of an appropriate binding agent for the material used in the extrusions, at selected regions where bends and twists are created, ensures that the structure has a robust integrity.

Figure 8B:
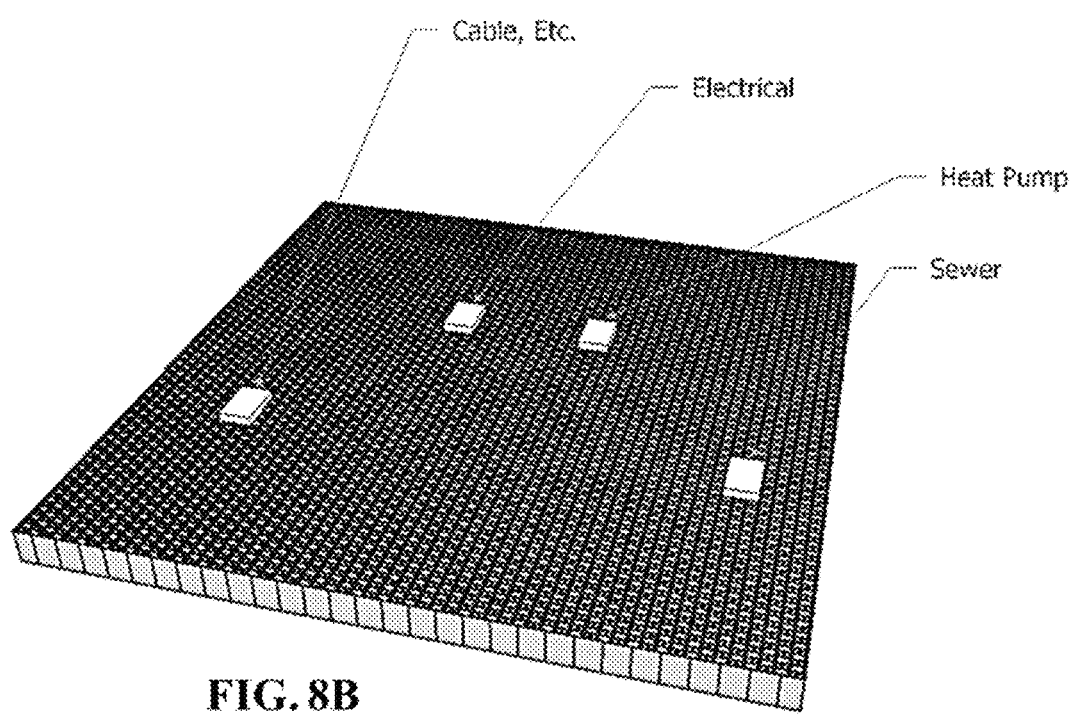
FIG. 8B depicts a cross-section of the base structural beam in the tree structure of FIG. 8A
Figure 8C:
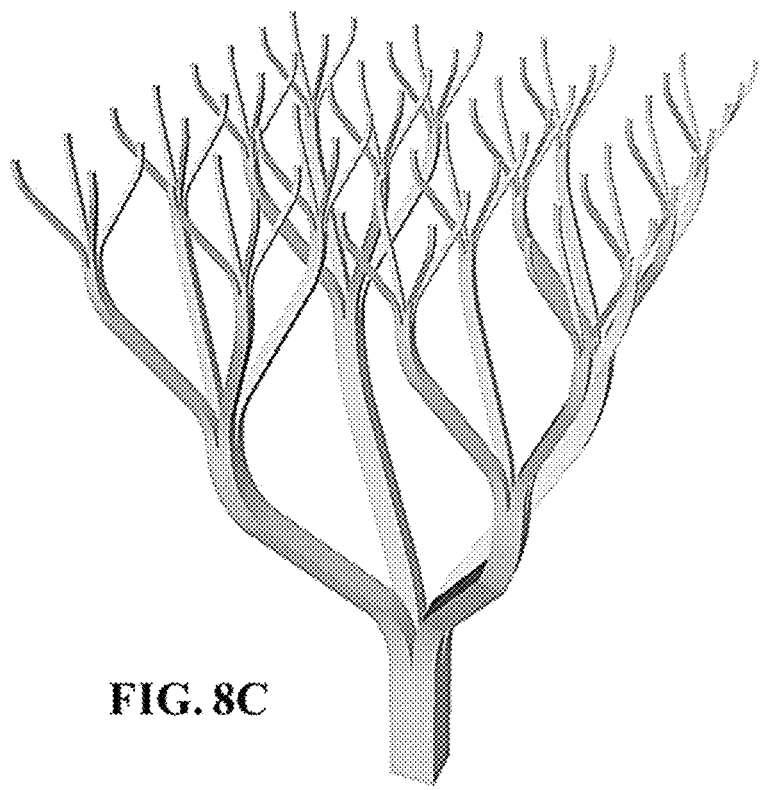
FIG. 8C depicts a variation of the tree structure of FIG. 8A but without twists.
Figure 8D:
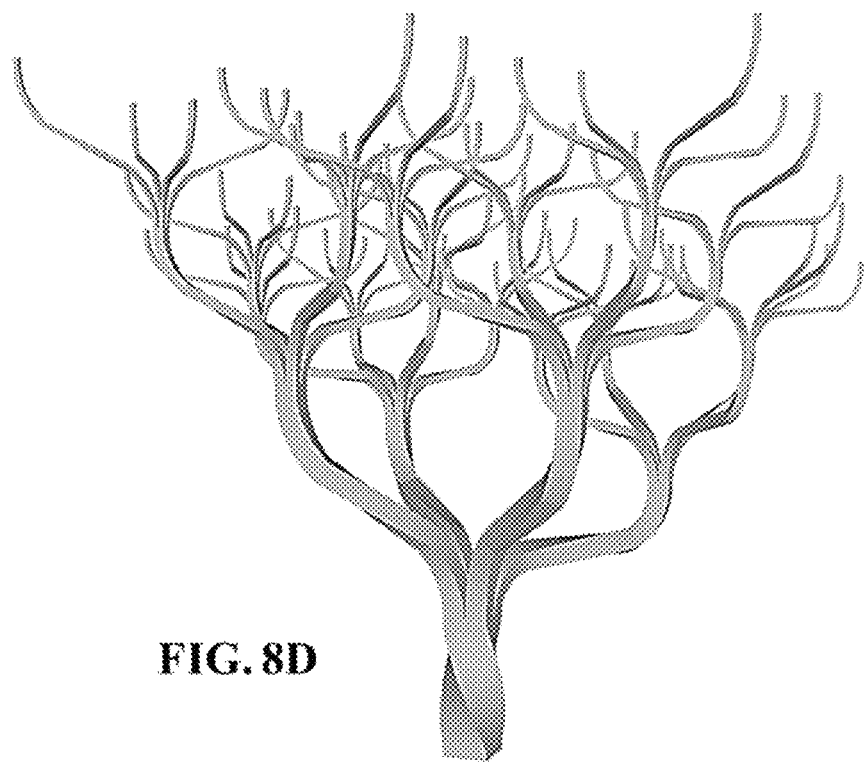
FIG. 8D depicts a variation of the tree structure of FIG. 8A using randomly bent sections.
Figure 8E:
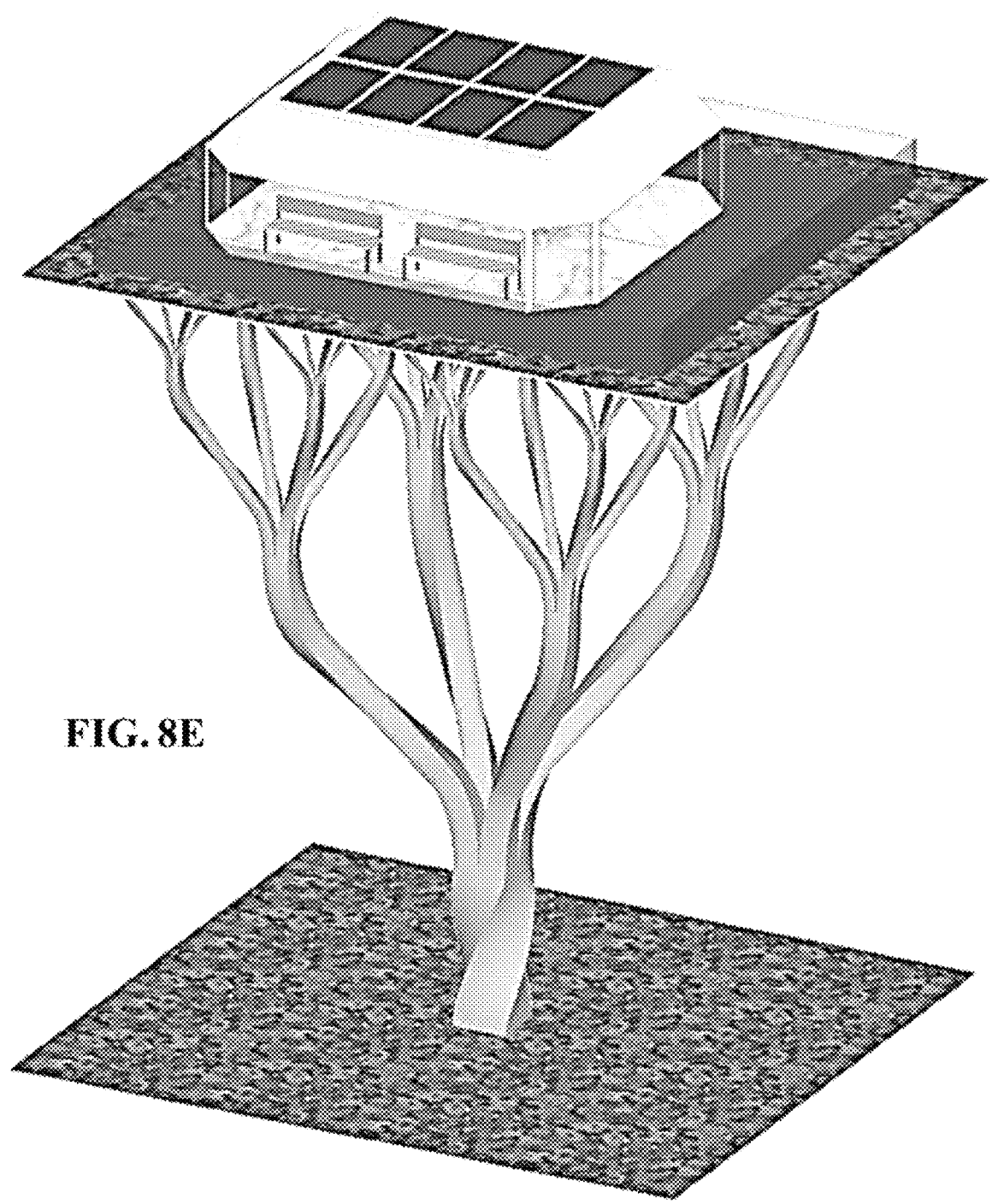
FIG. 8E illustrates a tree-house based on the tree structure of FIG. 8A.

FIG. 8B depicts a cross-section of the bundle of slidably interlocked extrusions at the base of a tree structure with voids forming conduits that travel up inside extrusion bundles in the tree structure to, for example, provide utilities such as electrical power, water, sewer, communications, heating and air conditioning, et al. such as might be necessary for a tree house at the top as illustrated in FIG. 8E. Building such a tree-house structure would also likely require a supporting foundation, a stress-relieving structure, a utility building, and a means for accent and decent.

FIG. 8C depicts a tree structure with evenly spaced treetop supports that provide load-bearing regions for interior building spaces that may require roof supports for an architectural design such as, for example, auditoriums, libraries, concert halls, et al.

FIG. 8D depicts a tree structure with random branch paths generated using an algorithm as an example of how software can facilitate the design of custom tree house structures.

FIGS. 9A and 9B depict perspective and orthogonal views respectively of branching structural component 900 comprising a primary vertical structural component 901 similar to those illustrated in FIG. 3B, but with side connection extrusion bundle 903 extending laterally from a side opening to create a connection with secondary vertical structural component 902. Extrusions of cell patterns selected from the complete set of derivative cell profiles 101 depicted in FIG. 1B, may be used to create the connection extrusion bundle 903 that interlocks with both primary and secondary vertical structural components 901 and 902 respectively. The secondary vertical structural component 902 may extend vertically straight up or be shaped into twisted or bent forms as partially depicted in FIGS. 9A and 9B, and as described references to FIG. 4C.

FIG. 9C shows a closeup of an opening 905 in the side of the primary vertical structural component 901 to receive the side connection extrusion bundle 903. A subset of extrusion bundles 904 in primary vertical structural component 901 terminate at the bottom of opening 905 and provide support for bearing the load of the secondary vertical structural component 902 with the attached side connection extrusion bundle 903. Extrusions in the side connection extrusion bundle 903 extend into opening 905 where they may be interlocked by snapping into sides 906 of opening 905. Extrusions used in the connection extrusion bundle 903 may be made from cell profiles having a snap-in non-removable locking feature similar to the cell profile in FIG. 18A of the '258 patent, and that snap into mating extrusions at edges 906 of opening 905. Alternatively, extrusions based on cell profiles selected from the complete set of derivative cell profiles 101 depicted in FIG. 1B, may be used in the side connection extrusion bundle 903 that interlock with mating extrusions in the side of the primary vertical structural component 901, and bound by gluing, fasteners, or other methods as discussed previously.

FIGS. 10A through 10D depict various views of an adaptor for connecting slideably interlocked bundles of extrusions formed in straight beams at orthogonal angles. FIG. 10A depicts an exploded view of vertical straight beam 1004, horizontal straight beam 1005, and connecting adaptor 1000 between the orthogonal beams. FIG. 10B shows a closeup view of adapter 1000 with array of extrusions 1001, a bundle of staggered extrusions 1003 that slide into opening 1006 in horizontal straight beam 1005, and a molded block 1002 that is bound to staggered extrusion 1003 and array of extrusions 1001.

FIG. 10C shows connection region 1007 exposed on a side of vertical straight beam 1004 into which the array of extrusions 1001 snap or slide to form a connection with adaptor 1000. Applying an appropriate binding agent for the material used in the extrusions, to extrusion bundle 1003 and array of extrusions 1001 on adaptor 1000 that when connected to posts 1004 and 1005 will bind the combined assembly of posts and adaptor to produce a robust, lasting structure.

FIG. 10D depicts a more detailed view of the shape of the extrusion bundle 1003 that slides into opening 1006 in the end of horizontal beam 1005. The staggering of extrusions in extrusion bundle 1003 serves to distribute bending forces and prevents stress points in the connection.

The size of molded block 1002 may vary depending on the forces to which the horizontal beam 1005 may be subjected. For example, an application where horizontal beam 1005 will be cantilevered, may require a molded block 1002 of greater size to cover a larger connection region 1007 extending above or below the junction where horizontal beam 1005 intersects the vertical beam 1004.

FIG. 11 depicts a bent arch 1100 similar to the U-shaped structural arch 600 shown in FIG. 6, with the bent arch 1100 having a bent beam attached to its top by adaptor 1101 similar to that of adaptor 1000 described in references to FIGS. 10A through 10D above. Since curved beam 1102 rests atop bent arch 1100, the adaptor 1101 is predominantly subjected to compression forces and as such, requires a smaller connection area and correspondingly a smaller molded block.

FIG. 12 depicts a structural dome frame 1200 comprising eight half-arched beams 1202 of extrusion bundles bent from straight beams such as depicted in FIG. 4A and shaped as described in references to FIG. 5A and FIG. 5B. Each half-arched beam 1202 is coupled to compression ring 1203 via one of eight adaptors 1201 that are bonded to connection regions evenly spaced around compression ring 1203. Adaptors 1201 are predominantly subjected to compression forces and as such, require a smaller connection area and correspondingly a smaller molded block.

FIGS. 13A through 13D depict cell patterns for making extrusions that can be assembled into slideably interlocked bundles that form circular structures such as cylinders, semi-cylinders, quarter-cylinders, et al. FIG. 13A depicts cylindrical cell patterns 1300 comprising circular primary cell profile 1301, derivative exterior cylindrical cell profile 1301*a*, and derivative interior cylindrical cell profile 1301*b*. FIG. 13B depicts a cylindrical structural component 1302 formed from slidably interlocked extrusions of the cell patterns 1301, 1301*a*, and 1301*b* based on a single ring of extrusions made from cylindrical cell patterns 1300. Instructional extrusion assembly 1303 illustrates how extrusion 1303*c* of primary cell profile 1301 interlocks with extrusions 1303*b* and 1303*a* of cell profiles 1301*b* and 1301*a* respectively. Extrusions 1303*b* and 1303*a* of cell profiles 1301*b* and 1301*a* respectively provide relatively smooth convex exterior and concave interior surfaces of cylindrical structural component 1302.

Figure 13D:
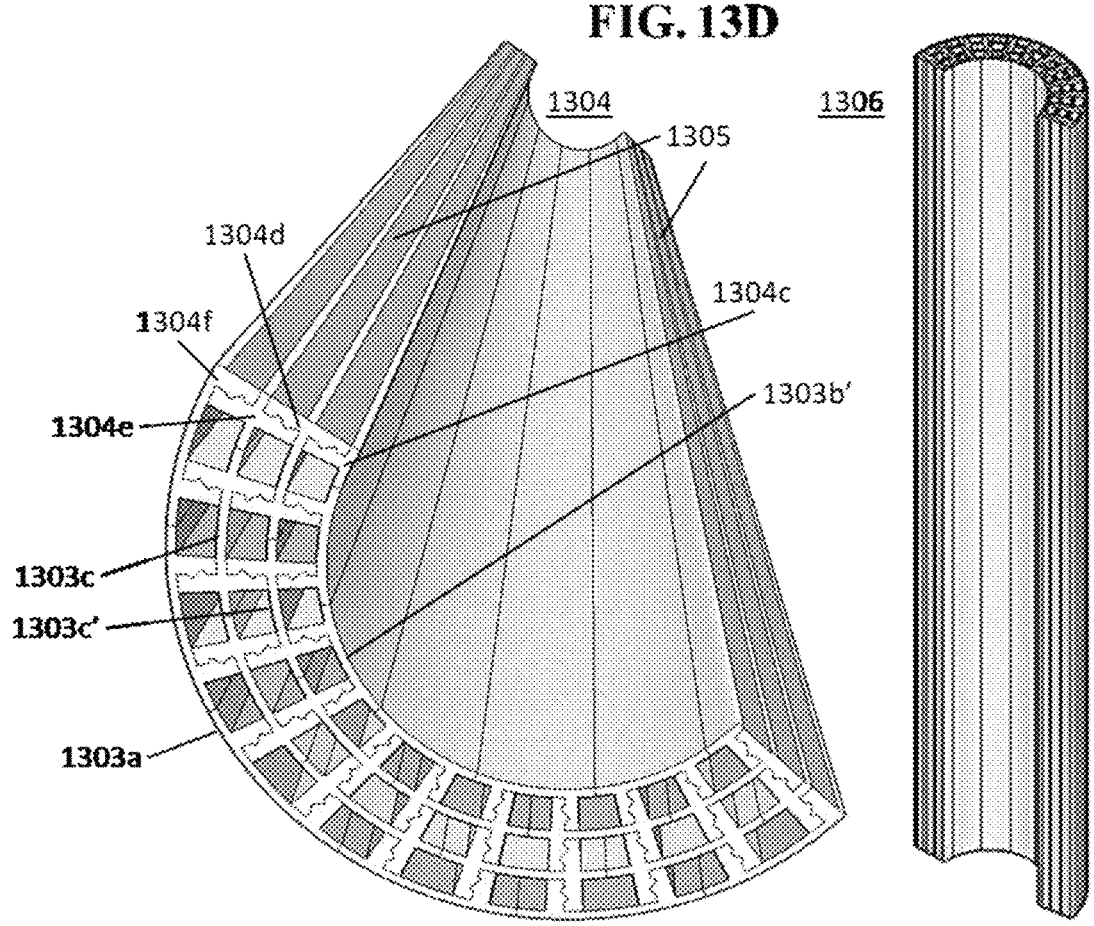
FIG. 13D depicts a set of derivative cell patterns depicted in FIG. 13A for extrusions that can be slidably interlocked to complete open surfaces for partial cylinder structural components.

FIG. 13C depicts additional derivatives of circular primary cell profile 1301, extrusions of which provide a relatively smooth exterior surface to finish the open sides of a partial cylinder like the semi-cylinder 1304 with open sides 1305 and illustrated in vertical image 1306 as depicted in FIG. 13D. Semi-cylinder 1304 is configured with two rings of slidably interlocked extrusions made from circular primary cell profile 1301 with exterior coverings made from extrusions of derivatives 1301a-1301f of circular primary cell profile 1301. Extrusions 1304c, 1304d, 1304e, and 1304f made from derivatives 1301c, 1301d, 1301e, and 1301f respectively of circular primary cell profile 1301, interlock with other extrusions in the semi-cylinder 1304 to provide relatively smooth surfaces that continue from the convex surface of the semi-cylinder 1304 to the open side 1305 surfaces to the concave surface of semi-cylinder 1304 as shown in FIG. 13D.

With the exception of extrusions 1304c, 1304d, 1304e, and 1304f used to finish open sides 1305, the remainder of slidably interlocked extrusions used to form semi-cylinder 1304 comprise multiple extrusions 1303a and 1303c as shown in instructional extrusion assembly 1303, and multiple additional extrusions 1303b' and 1303c' having smaller radius of curvatures and shorter lengths than extrusions 1303b and 1303c also shown in instructional extrusion assembly 1303. Adding rings of slidably interlocked extrusions that increases structural integrity requires using additional cell patterns of smaller radius of curvatures and shorter lengths of the cell patterns used to extrude outer rings and surface-covering derivatives based on multiple cylindrical cell patterns 1300 shown in FIGS. 13A and 13C.

FIG. 14 depicts a rigid, rectangular box mold 1400 comprising bundles of interlocked extrusions 1401 with a subset of extended slidably interlocked extrusions 1402 positioned at two corners of the rectangle. The extended slidably interlocked extrusions 1402 may be slid out from the adjoining interlocked extrusions of the box mold to release the casting for removal. Cylindrical molds may also be made with, for example, cylindrical structural components 1302 that additionally incorporate a subset of extended slidably interlocked extrusions at opposite points of the circular cross-section for releasing the casting for removal. Similarly, rectangular or cylindrical hollow structural components that are bent or twisted within its structural integrity limits may also be employed for molding, for example but not limited to, inexpensive material such as structural foam or concrete.

FIG. 15A depicts a bundle of slidably interlocked extrusions assembled in a rectangular cross-section and shaped to form a structural cylinder that may, for example, be used to support a table top as depicted in FIG. 15B. Similar to outside handrail 510 and inside handrail 511 depicted in FIG. 5E, this structural cylinder is formed by wrapping the slidably interlocked bundle of extrusions around a cylindrical form of a desired radius and pulled up in a rising spiral with a pitch that forms the cylinder without gaps.

FIGS. 16A and 16C depict bundles of slidably-interlocked extrusions made from a tube cell based on the basic tube cell profile 1601 depicted in FIG. 16B. Tube cell profile 1602 is derived by cutting tube cell profile 1601 vertically in half at the middle, and tube cell profile 1603 is derived by cutting tube cell profile 1601 in half lengthwise. Derivative tube cell profiles 1602 and 1603 are examples of potentially useful profiles for making bundles of slidably-interlocked tubular extrusions. Unlike extrusions made from cells based on cell profile 100 and cylindrical cell patterns 1300 that may be slid or snapped together, extrusions made from a tube cell may only be assembled by sliding them together. Due at least to its flexibility, low cost, and binding strength, PVC is well suited for making structures of bundled tube cell extrusions for prototyping and light to mid-weight structural components.

FIG. 17A depicts a 2D toy maze assembled from extrusion component blocks that can be interlocked with adjacent blocks by sliding or snapping together. FIG. 17B depicts a 3D toy maze assembled from extrusion component blocks in the same manner as the 2D toy maze. The 3D maze maker can attach a start sticker and an end sticker at any two points on the maze and challenge a friend to discover a path that connects the two points in a given amount of time. Component blocks may be made from long extrusions using cells based on, for example, cell profiles depicted in FIG. 1A, 1B, 13A, or 13C. The long extrusions can be cut to the desired block sizes suitable for a given kit size or other purpose.

Toy puzzle building kits comprising cut extrusions or injection molded components having cross-sections based on cell profiles depicted in FIG. 1A, 1B, 13A, or 13C may provide challenges to builders on how to assemble structures such as depicted in FIGS. 2A, 2B, 13B, and 13D, as well as a variety of geometric shapes that may be illustrated in the building kit instructions.

FIG. 18A depicts a large-scale maze furniture structure made similarly to how the 2D toy maze in FIG. 17A was assembled using larger extrusion component blocks that can be interlocked with adjacent blocks by sliding or snapping together to create a book shelf or display case. FIG. 18B depicts a large-scale 3D maze furniture structure made similarly to how the 3D toy maze in FIG. 17B was assembled, but using larger extrusion component blocks that can be interlocked with adjacent blocks by sliding or snapping together to create a display case. The top surfaces of the maze extrusions are finished with cover strips 1801 and one or more clear display plates 1802 rest atop supporting surfaces throughout the maze for displaying objects as desired.

Additional Considerations

Figure 19A:
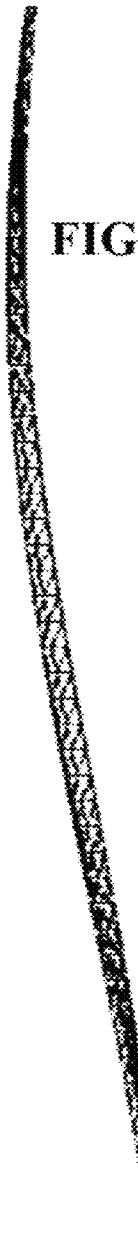
FIG. 19A-FIG. 19E depict the path of extrusions of beams are twisted and angular changes of lengths of extrusion sections.
Figure 19B:
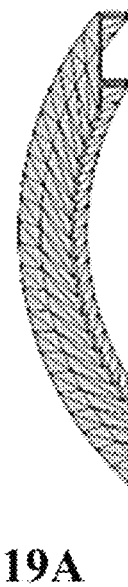
Figure 19D:
Figure 19C:
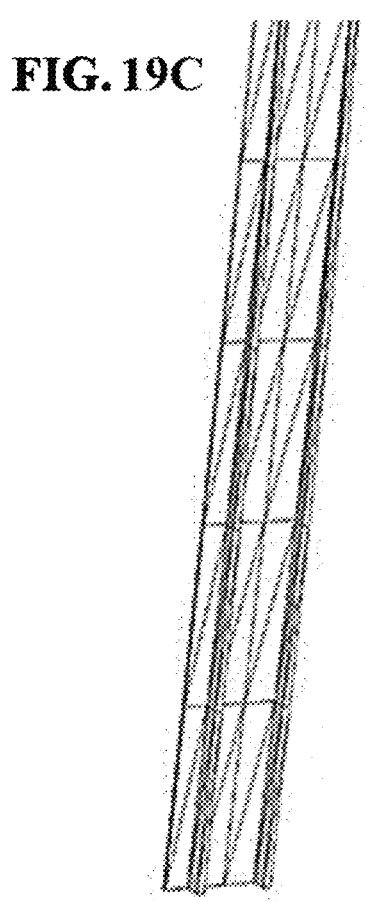
Figure 19E:
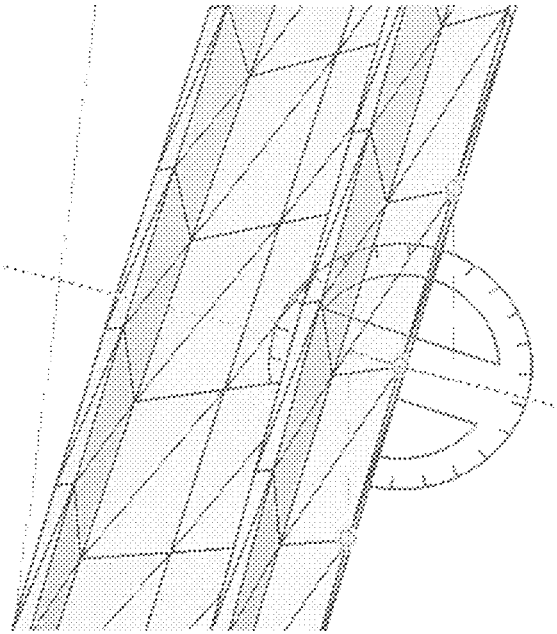

Maintaining structural integrity while bending or twisting a slidably interlocked bundle of extrusions must consider the extent to which individual extrusions in a bundle may be bent or twisted. FIGS. 19A-D show different views of a beam corner. FIG. 19A depicts the twisting path one of the corner extrusions of the twisted beam 403 of FIG. 4C. FIG. 19B depicts an outer surface side extrusion followed a 180-degree curved path when the bundle of twisted beam 403 of FIG. 4C was twisted. Graphics programs (e.g., Trimble's SketchUp) can show piecewise sections of extrusion, for example, as depicted in FIGS. 19C, and 19D that can facilitate measurement of angular changes experienced by the extrusion sections for a given length. FIG. 19E depicts the use of a protractor tool provided by the graphics program, and used in this example to measure the angle (176.4 degrees) between two piecewise sections of 2" length. This angle measurement verifies that the material can be safely bent within its structural limits. Different points in the sections can be selected to measure angles involved with twisting.

Alternatively, mathematical algorithms with a parametric equation of the path may be used, such as for the Lissajous roller coaster structure depicted in FIG. 20. The parametric equation defining the path of the roller coaster structure through space. x, y, and z are functions of p, where p is the length along the curve whose range depends on the axis. A partial differential equation such as, for example dx/dp will define the change in that axis relative to distance. A radius of curvature can be determined using dx/dp, dy/dp, and dz/dp. Because of bending and twisting, each cell extrusion in the bundle has a different parametric path that can be calculated as shown in the example 'C' code algorithmic parameters for x, y, and z axes for the following Lissajous roller coaster:

//Lissajous coaster
//p 0→1000
double x=60.0*sin(2.0*2.0*pi*p/1000.0);
double z=40.0*sin(4.0*2.0*pi*p/1000.0);
double y=5.0*sin(7.0*2.0*pi*p/1000.0)−40.0*p/1000.0;

Plastics, metals, composites, and other extrudable materials vary in their flexibility and coupled with the extrusion profile, must be considered when determining the limits of bends and twists. Experimentation and strength testing may also be required to determine safe limits.

Materials

A wide array of plastic materials that vary significantly in hardness and correspondingly in their flexural and compressive modulus. For example, polyvinyl chloride (PVC) may suitable for use in creating many types of general building structural components while glass-reinforced PVC, which may share similar characteristics of wood in strength and bulk density, might be better suited for making slidably-interlocked extrusion bundles in the form of standard lumber structural components such as depicted in FIGS. 3A and 3B. Other materials such as, but not limited to aluminum, pultruded composites, extrudable wood-resin compounds, et al. may also be suitable for making structural components of slidably-interlocked extrusion bundles based on factors such as availability, malleability, durability, cost, or other requirements.

Making a standard lumber structural component such as depicted in FIG. 3A, using a glass-reinforced PVC with similar mechanical properties as that of soft wood may be beneficial. The 2×4 structural component depicted in FIG. 3A is approximately ⅗ hollow and using a flexible PVC material of a given cross-sectional dimension of the extrusions having a density in the range of 2-3 times that of wood, the weight of the PVC component would be approximately the same as that of the wood 2×4. The strength of the glass-reinforced PVC component substantially reduced flexibility in the x- and y-axes and may be further strengthened by incorporating aluminum extrusions at selected locations in the extrusion bundle.

Bending and Twisting

This invention takes advantage of the fact that when extrusions are slid together to create a bundle, individual extrusions in the entire bundle will slide next to each other while maintaining the original relative orientation. Bending has two degrees of freedom allowing it to follow a path in three dimensions. Twisting adds another degree of freedom and can be combined with the bending.

An extrusion may bend or twist within a given limit depending at least on the material and cross-sectional shape and dimensions dictated by the cell profile used to create the extrusion. The hardness of a selected plastic material must be considered when determining the allowed bending or twisting limit of an extrusion in a slidably-interlocked bundle to prevent extrusions from decoupling with adjacent extrusions. For example, when a slidably-interlocked bundle is bent, the radius of curvature varies from a larger radius at the outer bundle surface to a smaller radius at the inner surface. When twisted, extrusions at the outer surface of bundles with large cross sections will experience greater distortion than those at the inner surface. Mathematical methods such as, but not limited to Finite Element Analysis (FEA) which is typically used for analysis in structural mechanics to determine deformation and stresses in dynamics of structures, and may well be required for determining extrusion stress limits, coupling limits, structural strength, etc. in complex shaped structural components. Limits of simple structural components may be determined experimentally or may possibly require little or no analysis depending on its material, the bend or twist desired, and the application.

Structural components made of slidably interlocked extrusion bundles that are bent into a curved beam are not pre-tensioned since the interlocked extrusions slide relative to adjacent extrusions. Bending slidably interlocked extrusion bundles however do exhibit local compression and tension forces. For example, local forces created by bending a bundle of slidably interlocked extrusions made of plastic, may be relieved by heating the bundle. Relieving local forces created by bending bundled slidably interlocked extrusions of other materials may also be accomplished by applying heat according to the specified requirements of the material such as annealing requirements for various metals. A straight beam such as that depicted in FIG. 4A may be prestressed by passing for example, metal cables or flat springs through the bottom half of the beam that bows the beam slightly so that when a distributed force is applied on the top of the beam (e.g., a concrete covering), it returns to a flattened state.

As discussed previously, larger shaped structural components made of slidably interlocked extrusion bundles may be more easily made by bending or twisting and binding a small "seed" bundle together to start with, and add outer layers of successive extrusions by sliding them onto the bent or twisted seed bundle. This can be further facilitated by heating extrusions, for example of a plastic or metal material, while sliding successive extrusions onto the seed bundle. Creating a large, bent or twisted structural component in the shape of a tree trunk would likely benefit from bending or twisting a seed bundle, and by heating successive extrusions being slid onto the outer layers the seed bundle.

Staggering Extrusions

For very long structures, short extrusions may be staggered within bundles and bound to adjacent extrusions with glue, fasteners, or other methods to strengthen beam sections in tension. This is a technique commonly used to build extended wooden beams with staggered laminated wood strips. Staggered extrusions within bundles of structural beams used in compression may not necessarily requiring binding like beams in tension.

Scaling

Extrusions made from, for example, primary cell profile 100 or derivatives may be made larger or smaller by simply scaling the size of the cell profile as desired. Small intricate objects such as, for example, puzzle toys, maze toys, toy structural building components, small-scale prototypes of structural components may be assembled from slideably-interlocked extrusions from small scaled cells. Large structural components such as, for example, buildings, ships, bridges, or other structures comprising bundles of slideably-interlocked extrusions made from large scaled cells.

Summation

Example embodiments of slidably interlockable extrusion cell profiles such as those presented in FIGS. 1A, 1B, 13A, 13C, and 16B have been illustrated and described in detail herein. Numerous embodiments of slidably interlocking bundles of extrusions can be made into various structural components such as standard lumber shapes and sizes as discussed in detail with respect to FIGS. 3A, 3B, 4A, and 4B, et al. Various other structural component embodiments may be cylindrically shaped forms such as described with respect to illustrations in FIGS. 13B, 13D, 14, 16A, and 16C have been disclosed and described herein. Detailed descriptions of how structural components made of slidably interlocked bundles of extrusions may be shaped by bending, twisting, branching, or joining the structural components into arches, boat hulls, domes, trees, furniture, and theme park structures as described with references to FIGS. 4C-12, 15A, 15B, and 19A-20. An embodiment described with reference to an implementation of a structural component made of slidably interlocked bundles of extrusions illustrated FIG. 14, that can be used as a mold to form other materials into structural or other components. References to embodiments illustrated in FIGS. 17A-18B describe using extrusions that can be interlocked by sliding or snapping to make components for 2D and 3D toy mazes and scaled-up versions that may be used in furniture applications.

The multiple various embodiments, configurations, and designs shown herein are not intended to be limiting in the type of structural and non-structural components made from single extrusions or slidably interlocked bundles of extrusions. The illustrative examples of cell profiles and how extrusions made from cells based on the cell profiles can be clearly accomplished but anyone skilled in the art would recognize many other ways of making structural and other components of slidably interlockable extrusions, and slidably interlocked bundles of extrusions.

The disclosed methods, apparatus, and systems should not be construed as limiting in any way. Instead, the disclosures herein are directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles disclosed herein may be applied, it should be recognized that the illustrated embodiments are only preferred examples and should not be taken as limiting the scope of the disclosure. Rather, the scope of the disclosure is defined by the following claims. We therefore claim all that comes within the scope of these claims.

The invention claimed is:

1. A structural building component comprising:
   a plurality of extrusions of a material comprising one of a metal, a plastic, a plastic-composite, a pultruded composite, a wood-resin compound, and a fiber-composite;
   each one of the plurality of extrusions being shaped from one of a plurality of cell profiles derived from a primary cell profile;
   the plurality of extrusions being assembled such that adjacent extrusions are slidable along a first axis and are interlocked along substantially orthogonal axes; and
   whereby the assembled plurality of extrusions forms a bundle of slideably interlocked extrusions, and
   forms a straight structural building component of a given length, width, and thickness.

2. The structural building component of claim 1 wherein the assembled bundle of slidably interlocked extrusions are shaped into one of a bend and a twist, and
   wherein one or more of the plurality of extrusions in the shaped assembled bundle of slidably interlocked extrusions are bound to prevent adjacent extrusions from sliding, and
   whereby the building component is formed into one of an arcuate shape and a twisted shape.

3. The structural building component of claim 1 wherein at least one extrusion of the plurality of extrusions comprises a conduit for channeling a binding agent that prevents at least one extrusion from sliding against an adjacent extrusion.

4. The structural building component of claim 1 wherein one or more of the plurality of slidably interlocked extrusions in the bundle are bound by the application of one of a binding agent and a locking fastener, and
   whereby bound extrusions in the bundle are prevented from sliding relative to an adjacent extrusion.

5. The structural building component of claim 2 wherein the shaped and bound assembled bundle of slidably interlocked extrusions is cut across the shaped building component to produce the desired length and desired angle.

6. The structural building component of claim 1 wherein one or more subsets of extrusions of the bundle of slidably interlocked extrusions extend beyond the length of other extrusions in the bundle, and
   whereby the extrusions of the bundle of slidably interlocked extrusions are staggered to extend the length of the building component comprising extrusions shorter than the desired length of the building component.

7. The structural building component of claim 2 wherein a subset of extrusions of the bundle of slidably interlocked extrusions form a bundle to create one of a conduit and a branch.

8. The structural building component of claim 1 wherein a plurality of subsets of extrusions of the bundle of slidably interlocked extrusions, the plurality of subsets of extrusions having at least one of a first length and a second length, and
   whereby the assembled bundle of slideably interlocked extrusions forms a structural building component comprising one of a rectangular frame, a partial rectangular frame, and a maze.

9. The structural building component of claim 2 wherein a plurality of subsets of extrusions of the bundle of slidably interlocked extrusions extend beyond the length of other extrusions in the bundle, and
   whereby the bundle of extrusions are staggered to extend the length of the substantially straight building component to a desired extended length.

10. The structural building component of claim 1 wherein the building component further comprises a hollow interior extending at least partially along the length of the building component.

11. The structural building component of claim 10 wherein the building component is open to the hollow interior at least partially along the length of the building component, and
    whereby the hollow interior opening along the length of the building component has a cross-section profile different than that of the substantially rectangular cross-section.

12. A structural building component comprising:
    a plurality of extrusions of a material comprising one of a metal, a plastic, a plastic-composite, a pultruded composite, a wood-resin compound, and a fiber-composite;
    each one of the plurality of extrusions being shaped from one of a plurality of cell profiles derived from a primary cell profile, each extrusion having a given length; and
    the plurality of extrusions being assembled such that adjacent extrusions are slidable along a first axis and interlocked along substantially orthogonal axes, and whereby forming a bundle of extrusions into a substantially straight structural building component of a desired length, width, and thickness and having a cross-section that is substantially rectangular.

13. The structural building component of claim 12 wherein the substantially straight structural building component is further formed into a structural building component having one of an arcuate shape and a twisted shape.

14. The structural building component of claim 12 wherein the substantially straight structural building component further comprises one of a hollow interior and an interior fully filled with extrusions.

15. The structural building component of claim 13 whereby the further formed structural building component is shaped into one of the following building components:
   a cylinder, a partial cylinder,
   a spiral cylinder, a partial spiral cylinder,
   an arcuate beam, a twisted beam, and
   a prestressed arcuate beam.

16. The structural building component of claim 14 wherein the substantially straight structural building component of a desired length, width, and thickness conforms to the dimensions of a standard lumber structural component.

17. The structural building component of claim 12 wherein a plurality of subsets of extrusions of differing lengths in the formed bundle of extrusions are staggard,
   whereby the formed bundle of staggard extrusions extend the length of the substantially straight building component to a desired extended length.

18. A cylindrical structural building component comprising:
   a plurality of extrusions of a material comprising one of a metal, a plastic, a plastic-composite, a pultruded composite, a wood-resin compound, and a fiber-composite;
   each one of the plurality of extrusions being shaped from one of a plurality of cell profiles derived from a primary cell profile, each extrusion having a given length; and
   the plurality of extrusions are assembled such that adjacent extrusions are slidable along a first axis and interlocked along substantially orthogonal axes, and
   whereby forming a bundle of extrusions into one of a cylindrical building component and a partial cylindrical building component.

19. The cylindrical structural building component of claim 18 wherein the formed bundle of extrusions comprises a substantially rectangular cross-section,
   wherein the cylindrical building component and the partial cylindrical building component are further formed into one of an arcuate shape and a twisted shape.

20. The cylindrical structural building component of claim 18 wherein the primary cell profile and its derivatives have arcuate shapes,
   whereby the formed bundle of extrusions comprises a substantially arcuate cross-section, and
   wherein the cylindrical building component and the partial cylindrical building component are further formed with an arcuate hollow interior.

21. The cylindrical structural building component of claim 20 wherein the cylindrical building component and the partial cylindrical building component are further formed into one of an arcuate shape and a twisted shape.

22. The cylindrical structural building component of claim 20 wherein a plurality of subsets of extrusions of differing lengths in the formed bundle of extrusions are staggard,
   whereby the formed bundle of staggard extrusions extend the length of the cylindrical building component and the partial cylindrical building component to a desired extended length.

* * * * *